US012637344B2

(12) United States Patent
Sarin

(10) Patent No.: US 12,637,344 B2
(45) Date of Patent: May 26, 2026

(54) INTEGRATED LIQUID DISPENSING SYSTEM AND METHOD OF MANUFACTURE AND USE

(71) Applicant: Mixim, Inc., Austin, TX (US)

(72) Inventor: Kabir Sarin, Austin, TX (US)

(73) Assignee: Mixim, Inc., Austin, TX (US)

( * ) Notice: Subject to any disclaimer, the term of this patent is extended or adjusted under 35 U.S.C. 154(b) by 0 days.

(21) Appl. No.: 18/804,608

(22) Filed: Aug. 14, 2024

(65) Prior Publication Data

US 2026/0048975 A1 Feb. 19, 2026

(51) Int. Cl.
*B67D 1/00* (2006.01)
*B67D 1/08* (2006.01)
*B67D 1/12* (2006.01)

(52) U.S. Cl.
CPC ......... *B67D 1/0037* (2013.01); *B67D 1/0041* (2013.01); *B67D 1/0888* (2013.01); *B67D 1/1211* (2013.01)

(58) Field of Classification Search
CPC .. B67D 1/0037; B67D 1/0041; B67D 1/0888; B67D 1/1211; B67D 2001/1259; B67D 2001/1261; B67D 2001/1263; B67D 2210/00157
See application file for complete search history.

(56) References Cited

U.S. PATENT DOCUMENTS 4,467,943 A 8/1984 Carse
2016/0090288 A1 3/2016 Givens, Jr. et al.
2018/0177329 A1* 6/2018 Segiet ................ A47J 31/4403
2020/0079637 A1* 3/2020 Kaplita ................ B67D 1/0058
2021/0238022 A1* 8/2021 McDougall .......... B67D 1/1247
2023/0063855 A1* 3/2023 Comunale ............ B67D 1/0006

FOREIGN PATENT DOCUMENTS

WO WO-9842612 A2 * 10/1998 ............... B67D 1/08
WO 2020157565 A1 8/2020

* cited by examiner

*Primary Examiner* — Frederick C Nicolas
*Assistant Examiner* — Michael J. Melaragno
(74) *Attorney, Agent, or Firm* — Caldwell LLC

(57) ABSTRACT

An integrated liquid dispensing system and method of its manufacture and use includes a mounting portion, a collar attached to its top face, a plurality of actuators, wherein at least an actuator of the plurality of actuators is configured to move along an axis between a first position and a second position, to include a proximal end and a distal end, to engage its distal end with at least a switch to start a liquid flow when in the first position, and to disengage its distal end from the at least a switch to stop the liquid flow when in the second position, and a control unit communicatively connected to the plurality of actuators, wherein the control unit is configured to receive a user input, determine an amount of liquid to dispense as a function of the user input, and dispense the amount of liquid.

20 Claims, 12 Drawing Sheets

INTEGRATED LIQUID DISPENSING SYSTEM AND METHOD OF MANUFACTURE AND USE

FIELD OF THE INVENTION

The present invention generally relates to the field of liquid dispensing systems. In particular, the present invention is directed to an integrated dispensing system for beverages.

BACKGROUND

Customized beverages such as cocktails are made by combining multiple solutions or ingredients in one vessel. Making such beverages manually is usually a time-consuming process, since bottles need to be fetched and returned, ingredients need to be measured and mixed, and tools need to be rinsed between uses. Such manual procedures are also prone to human errors and therefore usually performed by a specialist, as the type of ingredients, the amount of each ingredient, their sequence of addition, and/or additional precautions needed to make a beverage may easily vary from one recipe to another.

SUMMARY OF THE DISCLOSURE

In an aspect, an integrated liquid dispensing system is described. System includes a mounting portion and a collar attached to a top face of the mounting portion and configured to accept a bar gun, the bar gun including a plurality of switches, each of which is configured to dispense liquid when moved into an engaged position. System further includes a plurality of actuators, wherein at least an actuator of the plurality of actuators is configured to move along an axis between a first position and a second position, the at least an actuator includes a proximal end and a distal end, the at least an actuator is configured to engage its distal end with at least a switch of the bar gun to start a liquid flow when in the first position, and the at least an actuator is configured to disengage its distal end from the at least a switch of the bar gun to stop the liquid flow when in the second position. System further includes a control unit communicatively connected to plurality of actuators, wherein the control unit is configured to receive a user input, determine an amount of liquid to dispense as a function of the user input, and dispense the amount of liquid by sending at least a signal to at least an actuator of plurality of actuators, wherein the at least a signal causes the at least an actuator to move between first position and second position.

In another aspect, a method for manufacturing integrated liquid dispensing system is described. Method includes attaching mounting portion to a substantially flat surface and attaching collar to top face of the mounting portion, wherein the collar is configured to accept bar gun, the bar gun including plurality of switches, each of which is configured to dispense liquid when moved into engaged position. Method further includes integrating plurality of actuators into collar, wherein at least an actuator of the plurality of actuators is configured to move along axis between first position and second position, the at least an actuator includes a proximal end and a distal end, the at least an actuator is configured to engage its distal end with at least a switch of bar gun to start liquid flow when in the first position, and the at least an actuator is configured to disengage its distal end from the at least a switch of the bar gun to stop the liquid flow when in the second position. Method further includes connecting control unit to plurality of actuators, wherein the control unit is configured to receive user input, determine amount of liquid to dispense as a function of the user input, and dispense the amount of liquid by sending at least a signal to at least an actuator of the plurality of actuators, wherein the at least a signal causes the at least an actuator to move between first position and second position.

In another aspect, a method for using integrated liquid dispensing system is described. Method includes submitting, by a user, user input to control unit, determining, by the control unit, amount of liquid to dispense as a function of the submitted user input, and dispensing, by the control unit, the amount of liquid by sending at least a signal to at least an actuator of plurality of actuators, wherein the at least an actuator is configured to move along axis between first position and second position, the at least an actuator includes proximal end and distal end, the at least an actuator is configured to engage its distal end with at least a switch of bar gun to start liquid flow when in the first position, the at least an actuator is configured to disengage its distal end from the at least a switch of the bar gun to stop the liquid flow when in the second position, and the at least a signal causes the at least an actuator to move between the first position and the second position.

These and other aspects and features of nonlimiting embodiments of the present invention will become apparent to those skilled in the art upon review of the following description of specific nonlimiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an integrated liquid dispensing system, such as an integrated beverage dispenser, and methods of manufacture and use thereof. In one or more embodiments, system includes a mounting portion and a collar attached to a top face of the mounting portion and configured to accept a bar gun, a plurality of actuators, and a control unit communicatively connected to the plurality of actuators. Collar is configured to accept a bar gun containing a plurality of switches, each of which is configured to dispense liquid when moved into an engaged position. At least an actuator of plurality of actuators is configured to move along an axis between a first position and a second position, the at least an actuator includes a proximal end and a distal end, the at least an actuator is configured to engage its distal end with at least a switch of the bar gun to start a liquid flow when in the first position, and the at least an actuator is configured to disengage its distal end from the at least a switch of the bar gun to stop the liquid flow when in the second position. Control unit is configured to receive a user input, determine an amount of liquid to dispense as a function of the user input, and dispense the amount of liquid by sending at least a signal to at least an actuator of plurality of actuators, wherein the at least a signal causes the at least an actuator to move between first position and second position.

Aspects of the present disclosure can be used to automate and standardize the process of making mixed beverages such as cocktails. Aspects of the present disclosure may allow for the implementation of a home bar without a need for bartenders or a storage room for recipes. Exemplary embodiments illustrating aspects of the present invention are described below in the context of several specific examples, with numerous specific details set forth to provide a thorough understanding thereof. For purposes of description herein, relating terms, including "top", "bottom", "left", "right", "front", "back", "vertical", "horizontal", and derivatives thereof are defined from the perspective of a hypothetical person facing the front of an integrated liquid dispensing system.

Figure 1A:
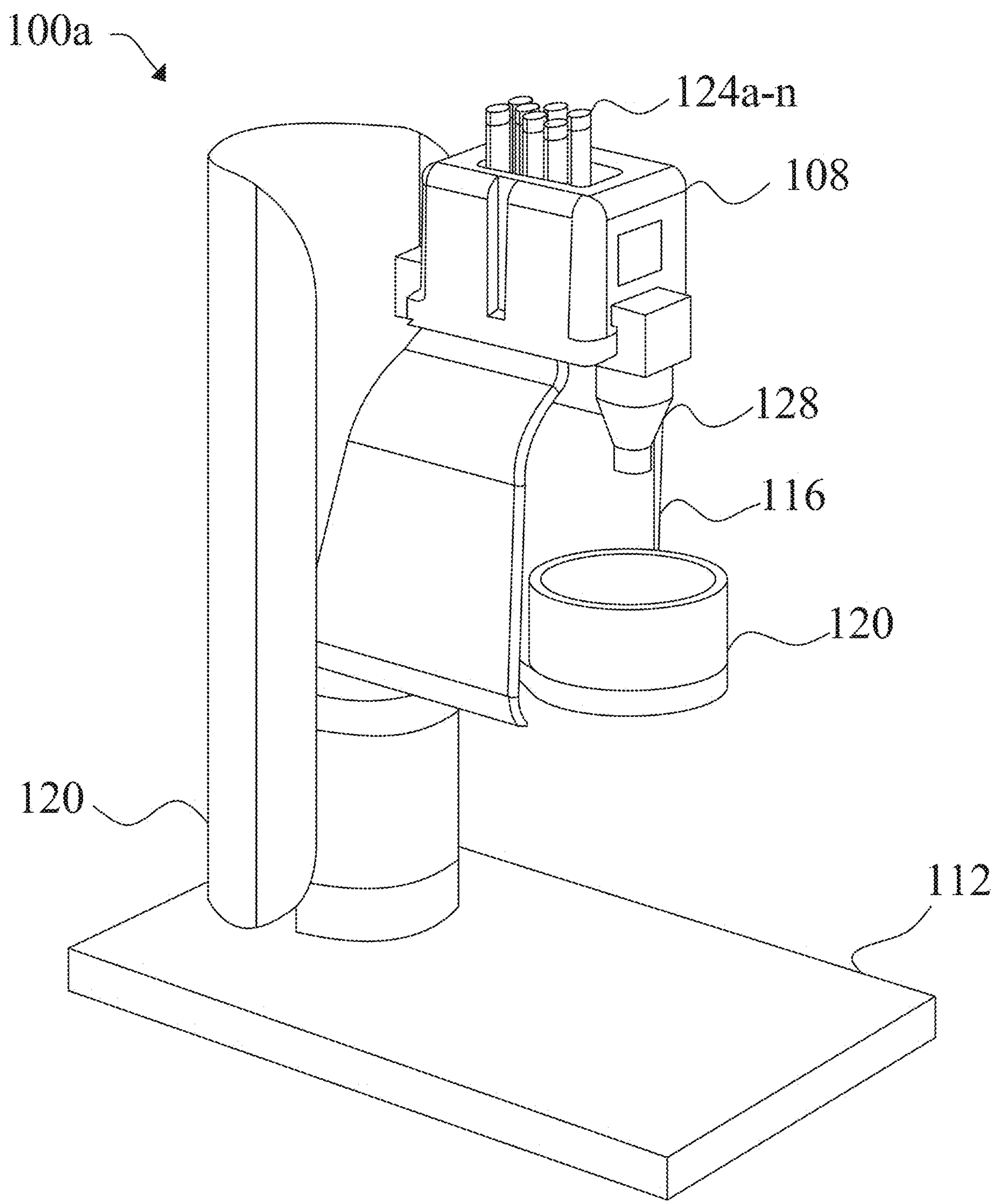
FIG. 1A is a schematic illustration of an exemplary embodiment of part of an integrated liquid dispensing system.

Referring now to FIG. 1A, an exemplary embodiment of integrated liquid dispensing system 100*a* is illustrated as view. For the purpose of this disclosure, a "liquid" is any form potable matter in liquid or fluidic form. In one or more embodiments, liquid may include a pure or nearly pure substance such as water. In one or more embodiments, liquid may include a homogeneous mixture, i.e., an aqueous solution of one or more strong electrolytes such as sodium chloride or mineral salts similar thereto. In one or more embodiments, liquid may include an aqueous solution of one or more weak electrolytes such as acetic acid. In one or more embodiments, liquid may include an aqueous solution of one or more nonelectrolytes such as glucose, sucrose, vitamins, or the like. In one or more embodiments, liquid may include an alcoholic solution that contains ethanol. In one or more embodiments, liquid may include a liquid infused with one or more gases such as carbon dioxide (e.g., soda or sparkling water) or nitrogen gas (e.g., nitro brew).

With continued reference to FIG. 1A, it should be noted that system 100*a* and related methods described herein are not limited to dispensing beverages or potable liquids only. For example, and without limitation, system 100*a* may be used for mixing solvents or reactants for chemical, biotechnology, or pharmaceutical research that requires high throughputs, combining cosmetic products such as essential oils, creams, moisturizers, serums, or the like into different formulations, among others. A person of ordinary skill in the art, upon reviewing the entirety of this disclosure, will recognize one or more embodiments described herein (although principally focused on dispensing beverages through a bar gun integrated within system 100) and their underlaying principles may be readily transferrable to a broader context of liquid or fluid dispensing systems that is not currently disclosed.

With continued reference to FIG. 1A, system 100*a* and/or components therein may be constructed using any suitable material or combination of materials having both sufficient rigidity and sufficient flexibility (i.e., elasticity). Suitable material or materials may not only support the weight of and/or tolerate the tension within system 100*a* while holding its components in place, but also withstand temporary deformation from their resting positions without cracking when assembled or disassembled. Mounting portion 104 and collar may be made, without limitation, of plant materials such as wood or bamboo, metals or metal alloys including but not limited to iron, manganese, nickel, copper, molybdenum, vanadium, silicon, titanium and/or aluminum, comparably robust synthetic and/or polymeric materials such as polyethylene (PE), polyethylene terephthalate (PETE), polypropylene (PP), polyvinyl chloride (PVC), polyvinylidene fluoride (PVDF), polytetrafluoroethylene (PTFE), and resins, composite materials such as fiberglass, any combination thereof, and/or any alternative material or materials known by a person of ordinary skill in the art having the benefit of the entirety of this disclosure to be suitable for system 100*a* and elements related thereto. In some cases, one or more elements within system 100*a* may include more internal voids to add lightness to system 100, making it easier to transport. In one or more embodiments, one or more elements within system 100*a* may include one or more internal bracing elements, such as triangular bracing made up of sheets or walls using one or more rigid materials. Bracing elements and voids may form any suitable configuration, including without limitation honeycomb construction. Such bracing may increase structural strength of an element while retaining lightness of construction introduced by one or more voids. In some cases, part of system 100, such as vessel holder or collar, may be made of one or more transparent materials such as glass, treated glass including laminated safety glass, or plexiglass including, but not limited to, Lexan polycarbonate, acrylic plastics including stretched acrylic, reinforced glass, and/or any material known by a person of ordinary skill in the art having the benefit of the entirety of this disclosure to be suitable for transparent materials. In some cases, certain elements of system 100, such as nozzle, may be in contact with dispensed liquid and therefore constructed with food-grade and/or corrosion-resistant materials such as silicone. Alternatively and/or additionally, one or more elements within system 100*a* may be treated to create any type of appearance or finish using any type of materials and/or method deemed suitable by a person of ordinary skill in the art upon reviewing the entirety of this disclosure; exemplary embodiments of finishes for plant-based materials such as wood may include pigmented wood primers, clear wood sealers, wood stains, clear lacquers, pigmented lacquer paints, varnishes, urethanes/polyurethanes, or the like; exemplary embodiments of finishes for metal-based materials may include metallic/metal oxide coatings, enamels, epoxy coatings, polyurethane coatings, among others. Elements of system 100*a* mentioned herein will be defined and/or described in detail below.

With continued reference to FIG. 1A, in one or more embodiments, one or more elements within system 100*a* may be mounted to one another using mechanical fasteners including, but not limited to, screws, nuts and bolts, anchors, clips, welding, brazing, crimping, nails, blind rivets, pull-through rivets, pins, dowels, snap-fits, clamps, and/or the like. In one or more embodiments, one or more elements within system 100*a* may be bound to one another using one or more adhesives, such as epoxy adhesives, polyurethane adhesives, polyimide adhesives, or the like. In some cases, elements within system 100*a* may be integrated with one another using one or more sets of mating features. For the purposes of this disclosure, a pair of "mating features" are two sets of complementary geometric structures, i.e., a first mating feature and a second mating feature, that are capable of interlocking with one another to secure a stable connection in between without slipping over one another. First mating feature may include any component of any latching or fastening apparatus and may latch or fasten to second mating feature, and vice versa. In one or more embodiments, first mating feature may form a mortise-and-tenon combination with second mating feature; the mortise-and-tenon combination may include at least a projection and/or recess in first mating feature that is inserted into and/or penetrated by a corresponding recess and/or projection in second mating feature. As a nonlimiting example, first mating feature may include at least a projection, which may be cylindrical or have any other suitable form, that projects from a surface. Alternatively and/or additionally, in one or more embodiments, other types of mating mechanisms, such as screws, bolts, snap lock mechanisms, twist lock mechanisms, and/or the like may be used. As a nonlimiting example, one or more mating components may include male grooves that are configured to be inserted into one or more receiving female grooves. Groove may include a tongue and groove, a half lap, a rabbet joint, a biscuit joint, a dowel joint, a dado going, an ordinary male groove, and the like. In one or more embodiments, a mating feature may be further divided into a plurality of mating sub-features, and more than one pair of mating sub-features may be implemented between two elements to further stabilize system 100*a*.

With continued reference to FIG. 1A, system 100*a* includes a mounting portion 104. For the purposes of this disclosure, a "mounting portion" is an element or group of elements that may serve as a base or scaffold for one or more other elements to attach or adhere to; it may be constructed using any material or method consistent with this disclosure; it may be implemented in any geometry or shape, or using any design deemed suitable by a person of ordinary skill in the art upon reviewing the entirety of this disclosure. In one or more embodiments, mounting portion 104 may include a flat or substantially flat base 112 suitable to stabilize system 100*a* against a flat or substantially flat surface such as a tabletop, a countertop, or a wall; the surface may be horizontal, vertical, or tilted at an angle that's not a right angle. For the purposes of this disclosure, a "substantially flat surface" is a surface that can be locally treated as flat despite having an extended curvature. In one or more embodiments, mounting portion 104 may include at least a cantilever 116 or at least another element of similar nature that extends away from base 112 to elevate one or more parts of system 100*a*. As a nonlimiting example, mounting portion 104 may include a cantilever 116 that extends in a vertical direction, with an adjustable height controlled by mechanical and/or electrical means, to make system 100*a* compatible with vessels of various sizes and shapes. In one or more embodiments, mounting portion 104 may include at least a vessel holder 120. Vessel holder 120 may be of any suitable shape recognized by a person of ordinary skill in the art as suitable for accommodating a vessel upon reviewing the entirety of this disclosure. As nonlimiting examples, shape may include right rectangular prism/right square prism, triangular prism, pentagonal prism, hexagonal prism, parallelepiped, rhombohedron, trigonal trapezohedron, right or oblique circular cylinder, elliptic cylinder, truncated sphere, truncated ellipsoid, or a similar geometry, including one or more variations thereof, that is flat or substantially flat on a first side and includes an opening on a second side facing opposite the first side.

With continued reference to FIG. 1A, system 100*a* comprises a collar 108 attached to a top face of mounting portion 104. For the purposes of this disclosure, a "collar" is a structural element that houses, bundles, and/or otherwise secures one or more parts in one shared space. In some cases, collar 108 may secure one or more parts, such as one or more actuators 124*a-n* therein by applying a pressure. Collar 108 is configured to accept a liquid dispenser. For the purposes of this disclosure, a "liquid dispenser" is an apparatus capable of initiating, terminating, or otherwise regulating a liquid flow and dispensing a certain amount of liquid as a function of one or more mechanical and/or electronic inputs. Nonlimiting examples of liquid dispensers include squeeze tubes/bottles, dropper bottles and pipettes, spray cans and aerosols, foam and cream pumps, and/or the like. In one or more embodiments, liquid dispenser may be used for mixing cosmetic products such as soaps or essential oils. In one or more embodiments, liquid dispenser may be used for mixing a plurality of chemical reactants or solvents for research and development purposes. In one or more embodiments, liquid dispenser may be used to dispense one or more potable liquids, such as one or more beverages. In some cases, liquid dispenser may include a bar gun and/or an apparatus of similar nature. As a nonlimiting example, collar 108 may include a shape or contour that matches the shape or contour of bar gun, such as a nozzle 128 that matches an outlet of bar gun. As another nonlimiting example, collar 108 may include mating features that interlock with complementary mating features on bar gun to secure it in place, as described above. For the purposes of this disclosure, a "bar gun" is a liquid dispensing apparatus that is connected to one or more sources of liquids and configured to dispense one or more potable liquids by alternating between open and closed configurations. Bar gun comprises a plurality of switches, wherein each switch of the plurality of switches is configured to dispense liquid when moved into an engaged position. In one or more embodiments, bar gun may be connected to a plurality of reservoirs through a plurality of pipes, wherein one or more liquids may be drawn from one or more reservoirs of the plurality of reservoirs and dispensed, as described below in this disclosure. In some cases, system 100*a* and/or at least a reservoir may be coupled to a cooling system such as a refrigerator, an ice box, or an ice machine. In some cases, system 100*a* may include an ice dispenser located within or near nozzle 128, facing opposite vessel holder 120. In some cases, system 100*a* may include an agitator that stirs or mixes a plurality of liquids into a uniform, homogenous mixture before dispensing, as described below. In one or more embodiments, bar gun may be connected to at least pump, wherein the at least a pump is configured to pump liquid from at least a reservoir. As a non-limiting example, a reservoir may include a bottle of liquor or liquor, such as vodka, rum, whisky, APEROL, CAMPARI, vermouth, and the like. In some embodiments, reservoir may include juices, such as cranberry juice, orange juice, grapefruit juice, lime juice, lemon juice, and the like. In some embodiments, reservoir may include a bottle that has been fitted with a liquid transport tube. A "liquid transport tube," for the purposes of this disclosure, is a tube that is configured to provide liquid transport between two or more fluidly connected objects. In some embodiments, liquid transport tube may be fluidly connected to a pump, such that fluid may be drawn from reservoir into liquid transport tube. In some embodiments, liquid transport tube may be fluidly connected to nozzle or outlet such as nozzle 128. In some embodiments a control unit 404 may control a pump to control the amount of fluid pumped from reservoir in accordance with a user input. In some embodiments, a valve may be connected to fluid transport tube to control the amount of liquid that can pass through fluid transport tube.

With continued reference to FIG. 1A, for the purposes of this disclosure, a "pump" is a mechanical apparatus that converts mechanical power into fluidic energy. Pump may include a substantially constant pressure pump (e.g., centrifugal pump) or a substantially constant flow pump (e.g., positive displacement pump, gear pump, and the like). Pump may be hydrostatic or hydrodynamic; hydrostatic pumps are positive displacement pumps; hydrodynamic pumps may be fixed displacement pumps, in which displacement may not be adjusted, or variable displacement pumps, in which the displacement may be adjusted. Pump may generate flow with enough power to overcome pressure induced by a load at a pump outlet. Pump may generate a vacuum at pump inlet, thereby forcing fluid from reservoir into the pump inlet to the pump and by mechanical action delivering this fluid to a pump outlet. Exemplary nonlimiting pumps include gear pumps, rotary vane pumps, screw pumps, bent axis pumps, inline axial piston pumps, radial piston pumps, and the like. Pump may be powered by any rotational mechanical work source, for example without limitation an electric motor or a power take-off from an engine. Pump may be in fluidic communication with at least a reservoir. In some cases, reservoir may be unpressurized and/or vented. Alternatively, reservoir may be pressurized and/or sealed. In one or more embodiments, bar gun may be coupled to at least a source of compressed gas, such as a gas tank, through at least a tube, wherein compressed gas such as carbon dioxide and nitrogen gas may be infused into liquid through the at least a tube.

Figure 1B:
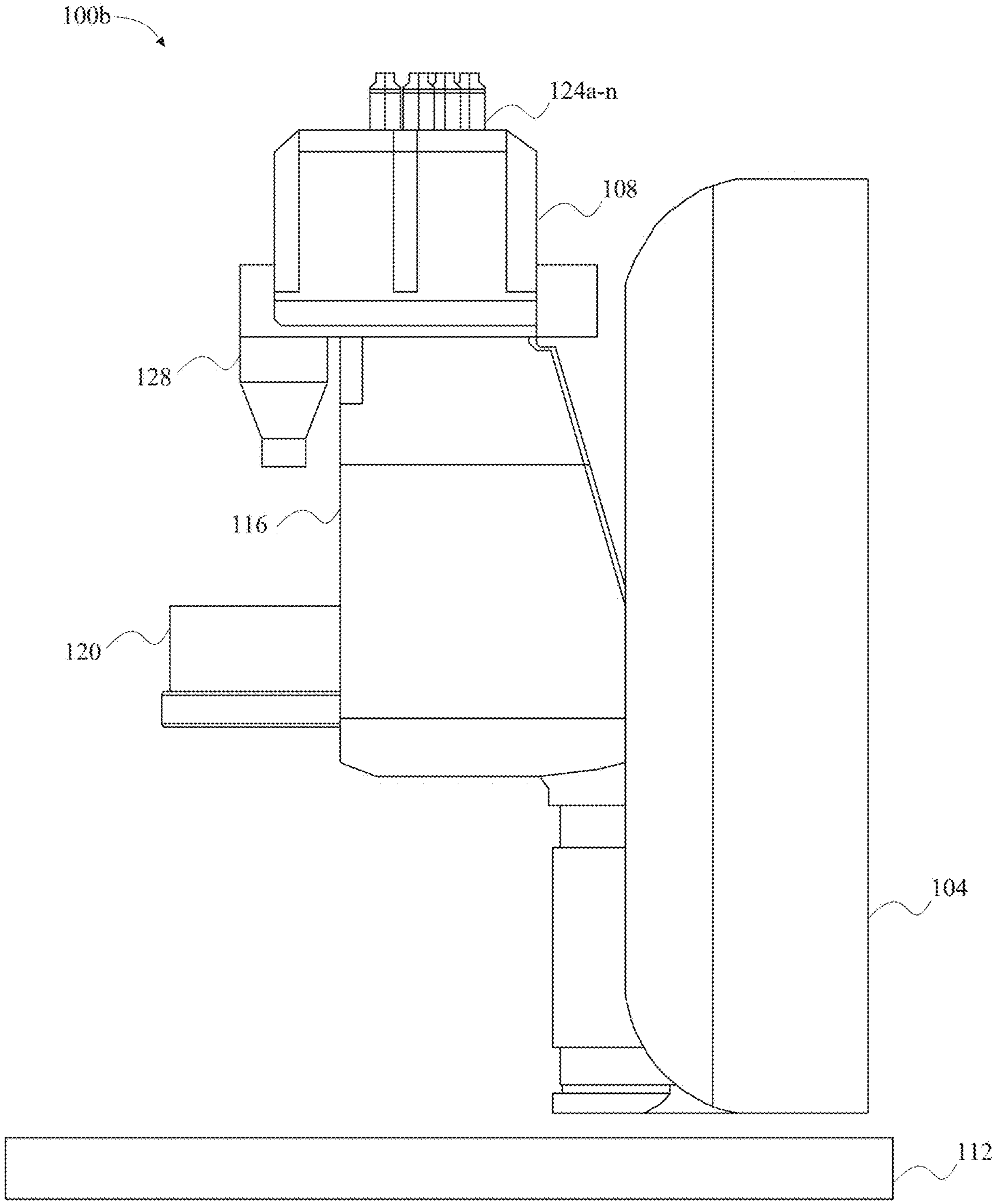
FIG. 1B is a right-side view of the exemplary embodiment shown in FIG. 1A.

Referring now to FIG. 1B, a right-side view of a system 100*b* is shown.

Figure 1C:
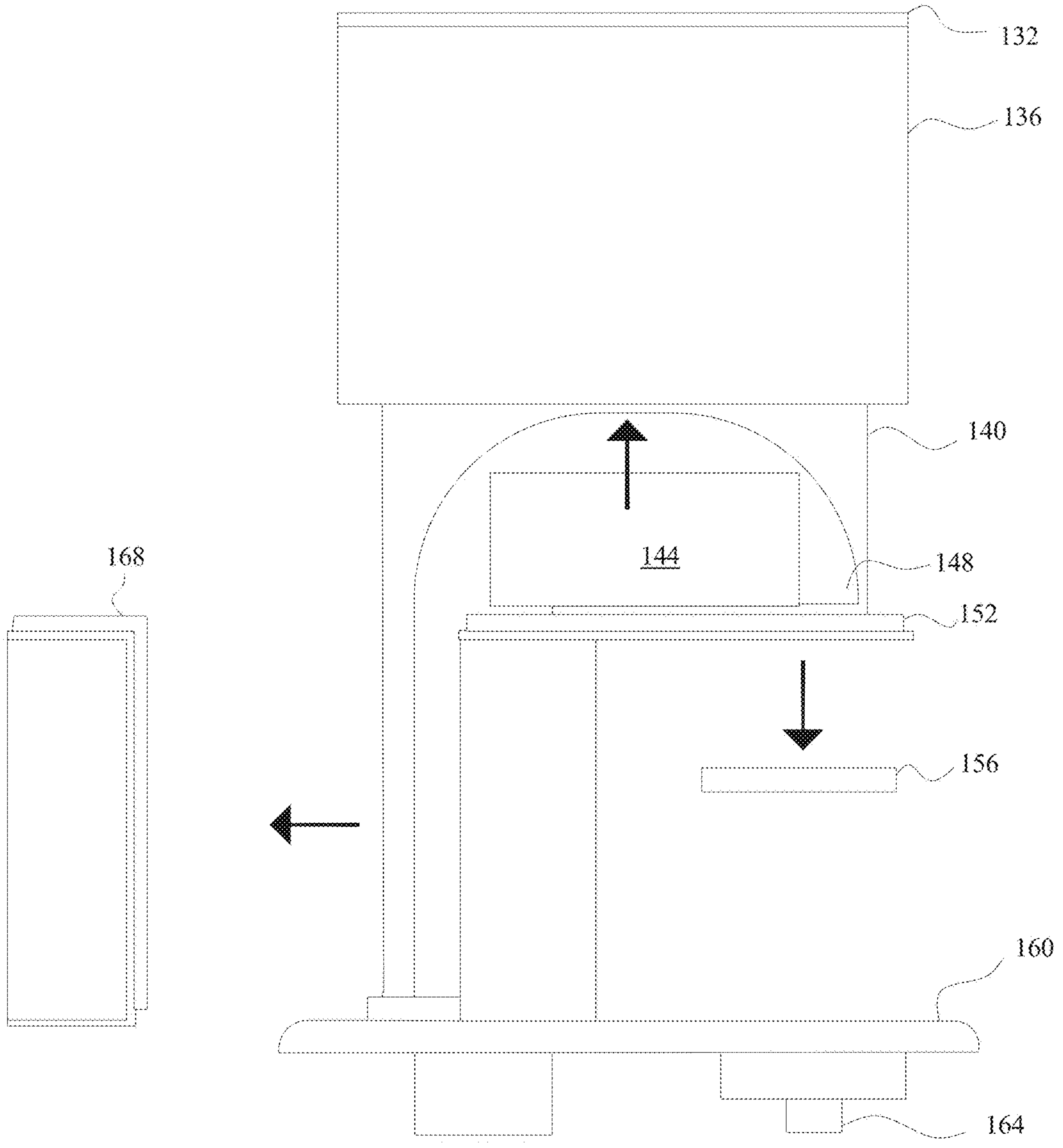
FIG. 1C is an exploded view of an alternative exemplary embodiment of part of an integrated liquid dispensing system.

Referring now to FIG. 1C, an alternative exemplary embodiment of system 100*c* is illustrated as an exploded view. System 100*c* may include a top cover panel 132. Top cover panel 132 may be configured to cover a top surface of collar 108, thereby preventing contents therein from collecting dust or otherwise being contaminated. As a nonlimiting example, top cover panel 132 may include a top cover panel 132 made of plastic, consistent with details described in this disclosure. System 100*c* may include a main body cover 136. As a nonlimiting example, main body cover 136 may include a metal sleeve. System 100*c* may include an inner separator 140. Inner separator 140 may be configured to divide collar 108 and contents therein and/or to add mechanical strength to system 100*c*. System 100*c* may include an internal chassis 144 configured to mount and/or interface with a liquid dispenser, such as a bar gun, consistent with details described within this disclosure. System 100*c* may include one or more flexible tubes 148 configured to deliver one or more liquids for mixing and/or dispensing, consistent with details described elsewhere in this disclosure. System 100*c* may include a basis chassis 152 configured to support collar 108 and/or contents therein. System 100*c* may include a tube end cap 156, which may be integrated as part of base chassis 152. System 100*c* may include a drip tray 160. Drip tray 160 may be located at a top surface of base 112 and used to collect liquid discarded by a user. Drip tray 160 may be connected to a drain or the like through a drain connection 164. System 100*c* may include a rear panel 168. Rear panel 168 may be integrated as part of mounting portion 104 and configured to further stabilize system 100*c* and improve its mechanical strength. As a nonlimiting example, rear panel 168 may include a rear panel 168 constructed using a plastic shell coated with a metal cover.

Figure 2A:
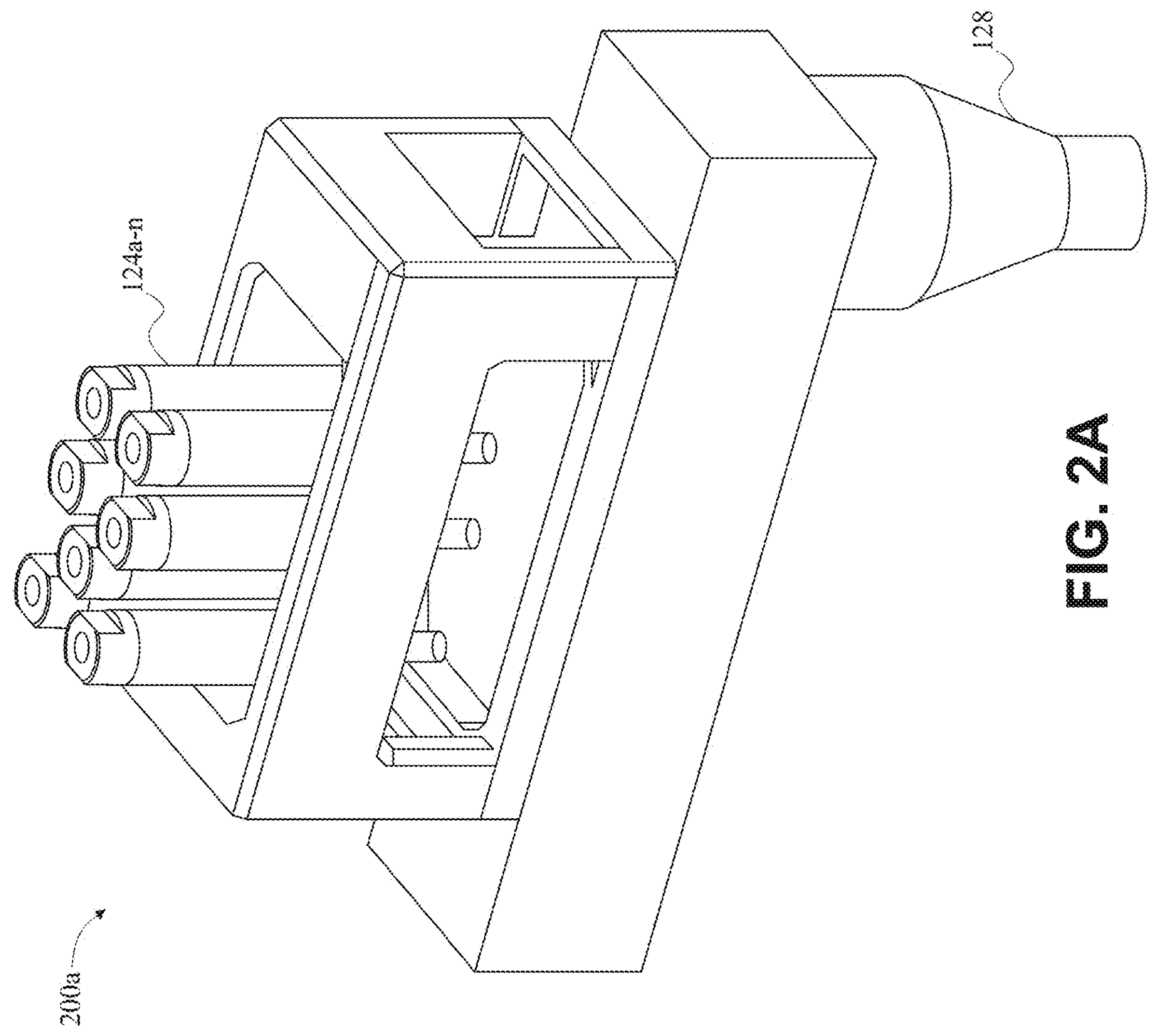
FIG. 2A is a schematic illustration of an exemplary embodiment of a plurality of actuators integrated within a collar.
Figure 2B:
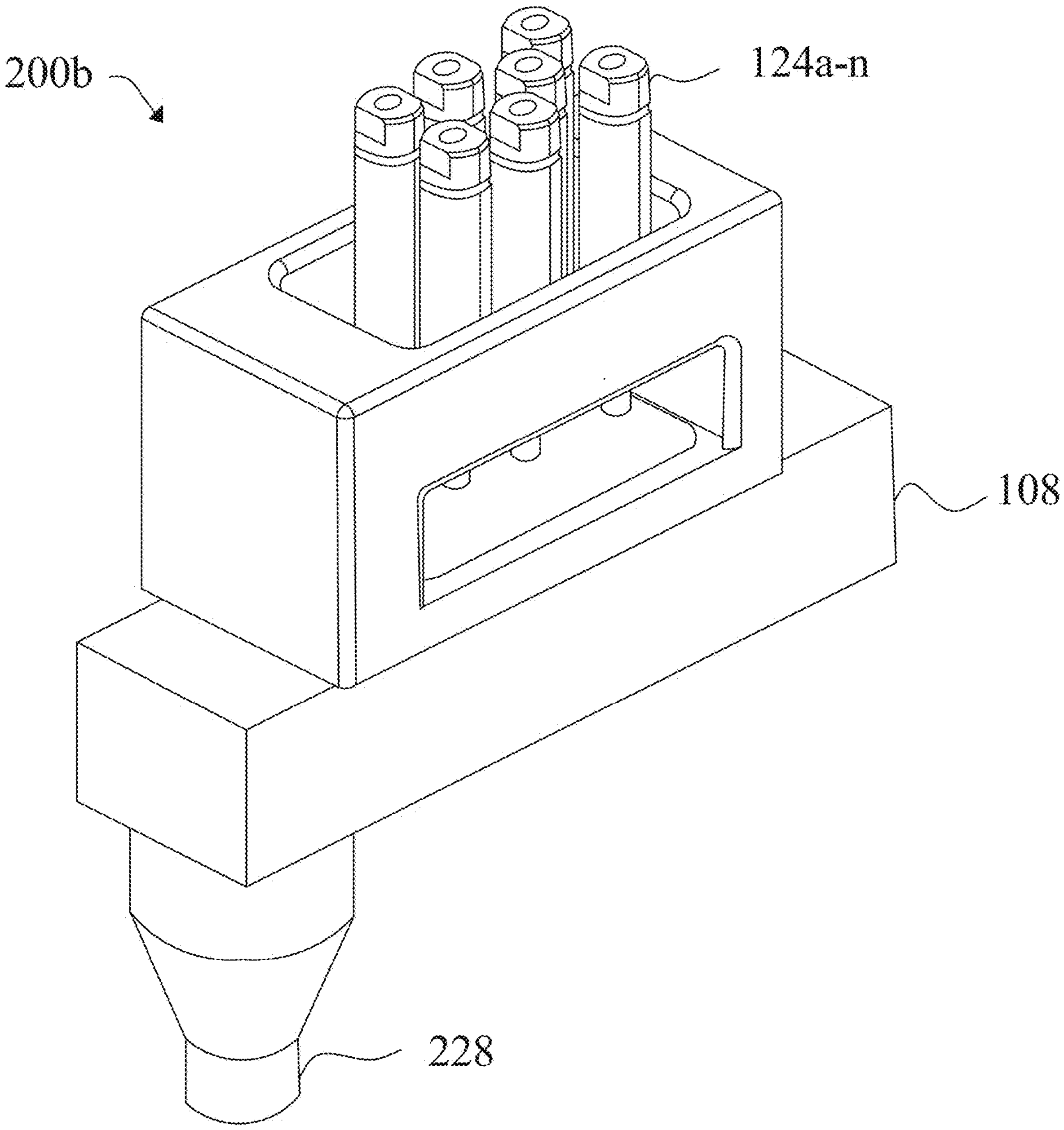
FIG. 2B is a modified schematic illustration of the exemplary embodiment shown in FIG. 2A, with the exterior of the collar shown as transparent to reveal details therein.
Figure 2C:
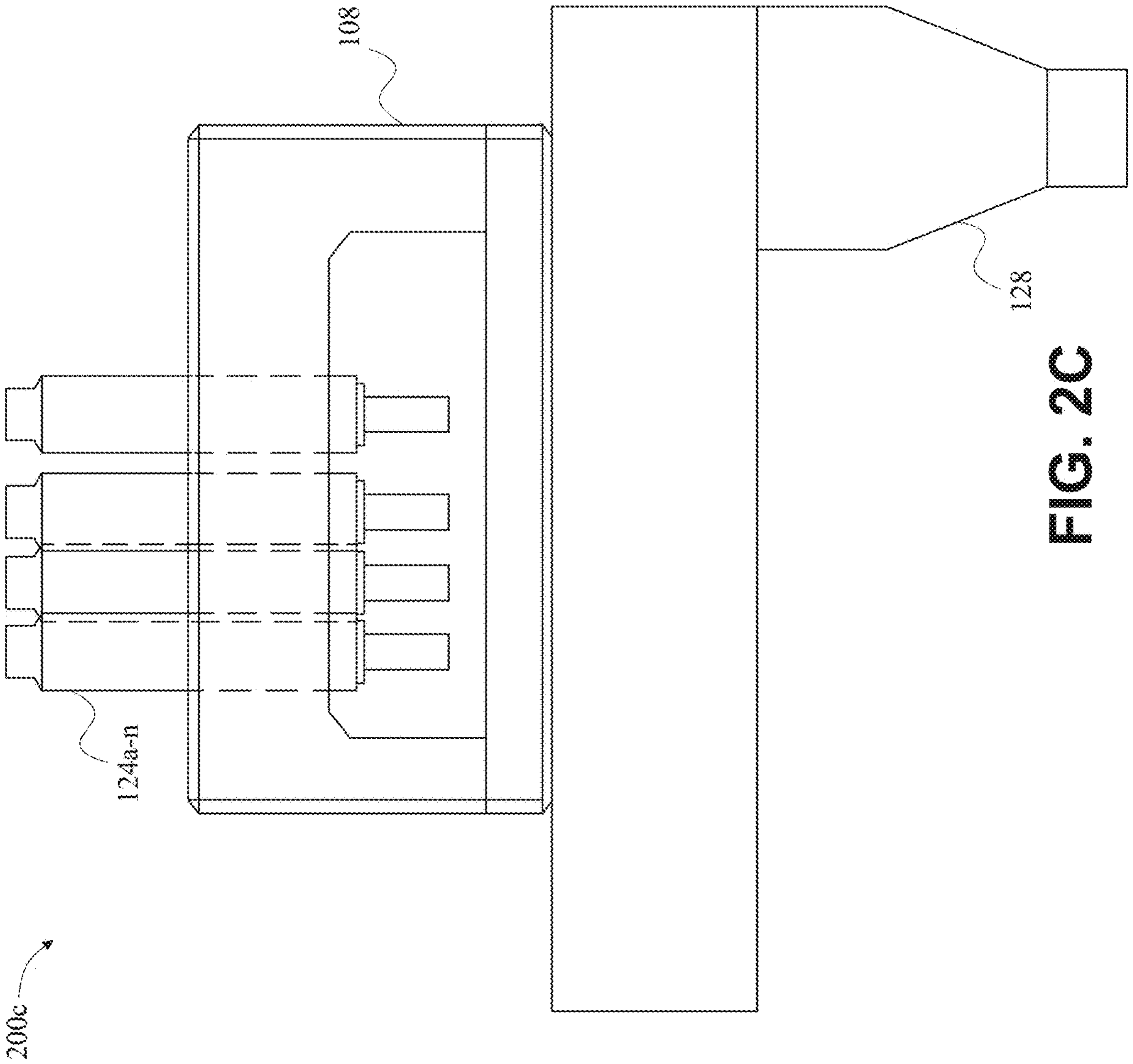
FIG. 2C is left-side view of the exemplary embodiment shown in FIG. 2A.

Referring now to FIG. 2A, FIG. 2A shows a schematic illustration 200*a* of an exemplary embodiment of a plurality of actuators 124*a-n* integrated within collar 108. System 100*c* comprises a plurality of actuators 124*a-n*. In some cases, system 100*c* may include as few as six and as many as fourteen actuators 124*a-n*. In some embodiments, as viewed from the top down, actuators may be laid out in a 2-1-2-2 formation (as seen in FIGS. 2A-C), a 2-1-2-2 formation, a 2-1-2-2-1 formation, a 2-1-2-2-2-1-2 formation, a 2-1-2-2-1-2 formation, a 2-1-2-2-2-2-1-2 formation, and the like. For the purposes of this disclosure, an "actuator" is a device or a component of a machine that produces force, torque, or displacement, usually in a controlled manner, when an electrical, pneumatic, or hydraulic input is supplied to it in an actuating system and converted into a required form of mechanical energy. Actuator 124*a-n* may, in some cases, require a control signal and/or a source of energy or power, as described below in this disclosure. In some cases, control signal may be relatively low energy. Exemplary control signal forms include electric potential or current, pneumatic pressure or flow, hydraulic fluid pressure or flow, mechanical force/torque or velocity, or even human power. In some cases, actuator 124*a-n* may have source of energy or power other than control signal. This may include a main energy source, which may include for example electric power, hydraulic power, pneumatic power, mechanical power, and/or the like. In some cases, upon receiving control signal, actuator 124*a-n* may respond by converting source power into mechanical motion. In some cases, actuator 124*a-n* may be understood as a form of automation or automatic control.

With continued reference to FIG. 2A, in one or more embodiments, actuator 124*a-n* may include a hydraulic actuator. Hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases, are incompressible, hydraulic actuators may be capable of exerting large forces. Additionally, as force is equal to pressure multiplied by area, hydraulic actuators may act as force transformers with changes in area (e.g., cross-sectional area of a cylinder and/or piston). An exemplary hydraulic cylinder may consist of a hollow cylindrical tube within which piston can slide. In some cases, hydraulic cylinder may be considered single acting. A single-acting piston may be used when fluid pressure is applied substantially to just one side of the piston. Consequently, single-acting piston may move in only one direction. In some cases, a spring may be used to give single-acting piston a return stroke. In some cases, hydraulic cylinder may be double acting. A double-acting piston may be used when pressure is applied substantially on each side of the piston; any difference in resultant force between the two sides of piston may cause the piston to move.

With continued reference to FIG. 2A, in one or more embodiments, actuator 124*a-n* may include a pneumatic actuator 124*a-n*. In some cases, pneumatic actuators may enable considerable forces to be produced from relatively small changes in gas pressure. In some cases, pneumatic actuators may respond more quickly than other types of actuators, for example hydraulic actuators. Pneumatic actuators may use compressible fluid. In some cases, pneumatic actuators may operate on compressed air. Operation of hydraulic and/or pneumatic actuators may include control of one or more valves, circuits, fluid pumps, and/or fluid manifolds.

With continued reference to FIG. 2A, in some cases, actuator 124*a-n* may include an electric actuator. Electric actuator 124*a-n* may include any electromechanical actuators, linear motors, and the like. Electromechanical actuators may convert a rotational force of an electric rotary motor into a linear movement to generate a linear motion through a mechanism. Exemplary mechanisms include rotational-to-translational motion transformers, such as without limitation a belt, a screw, a crank, a cam, a linkage, a scotch yoke, and the like. In some cases, control of electromechanical actuator may include control of electric motor; for instance, control signal may control one or more electric motor parameters to control the electromechanical actuator. Non-limiting examples of electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In some cases, linear motor may cause less friction loss than other devices. Linear motors may be further specified into at least three different categories, including flat linear motor, U-channel linear motors and tubular linear motors. Linear motors may be directly controlled by control signal for controlling one or more linear motor parameters. Nonlimiting examples of linear motor parameters include position, force, velocity, potential, and current. In some cases, electric actuator may include a solenoid actuator. For the purposes of this disclosure, a "solenoid" is a device capable of converting electrical energy into mechanical work; it comprises a coil of wire, a housing, and a movable plunger; when an electrical current is introduced, a magnetic field forms around the coil which moves the plunger.

With continued reference to FIG. 2A, in one or more embodiments, actuator 124*a-n* may include a mechanical actuator. In some cases, mechanical actuator may function to execute movement by converting one kind of motion, such as rotary motion, into another kind, such as linear motion. An exemplary mechanical actuator includes without limitation a rack and pinion. In some cases, a mechanical power source, such as a power take-off, may serve as a power source for mechanical actuator. Mechanical actuators may employ any number of mechanisms, including for example without limitation gears, rails, pulleys, cables, linkages, and the like.

With continued reference to FIG. 2A, system 100 is connected to at least a power source. Power source may include any fixture or device capable of providing energy to at least a component of system 100, such as one or more actuators 124*a-n*. Power source may include, without limitation, a wall outlet, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The power source and/or energy storage device may include at least a battery, a battery cell, and/or a plurality of battery cells connected in series, in parallel, or in a combination of series and parallel connections such as series connections into modules that are connected in parallel with other like modules. Battery and/or battery cell may include elements such as, without limitation, lithium nickel cobalt aluminum oxides, nickel manganese cobalt oxide, lithium iron phosphate, and lithium manganese oxide cathodes, which may be mixed with one another or with another cathode material to provide more specific power as required by the application; lithium metal anodes that provide high power on demand; and silicon or titanite anode. In one or more embodiments, battery may include, without limitation, a battery using nickel-based materials such as nickel cadmium or nickel metal hydride, a battery using lithium ion battery materials such as a nickel cobalt aluminum oxide, nickel manganese cobalt oxide, lithium iron phosphate, lithium cobalt oxide, and/or lithium manganese oxide, a battery using lithium polymer technology, lead-based batteries such as without limitation lead acid batteries, metal-air batteries, or any other suitable alternative. A person of ordinary skill in the art, upon reviewing the entirety of this disclosure, will be aware of various devices of components that may be used as power source.

Referring now to FIG. 2B-C, FIG. 2B is a modified schematic illustration 200*b* of the exemplary embodiment shown in FIG. 2A, with the exterior of collar 108 shown as transparent to reveal details therein, whereas FIG. 2C is left-side view 200*c* of the exemplary embodiment shown in FIG. 2A.

Figure 3:
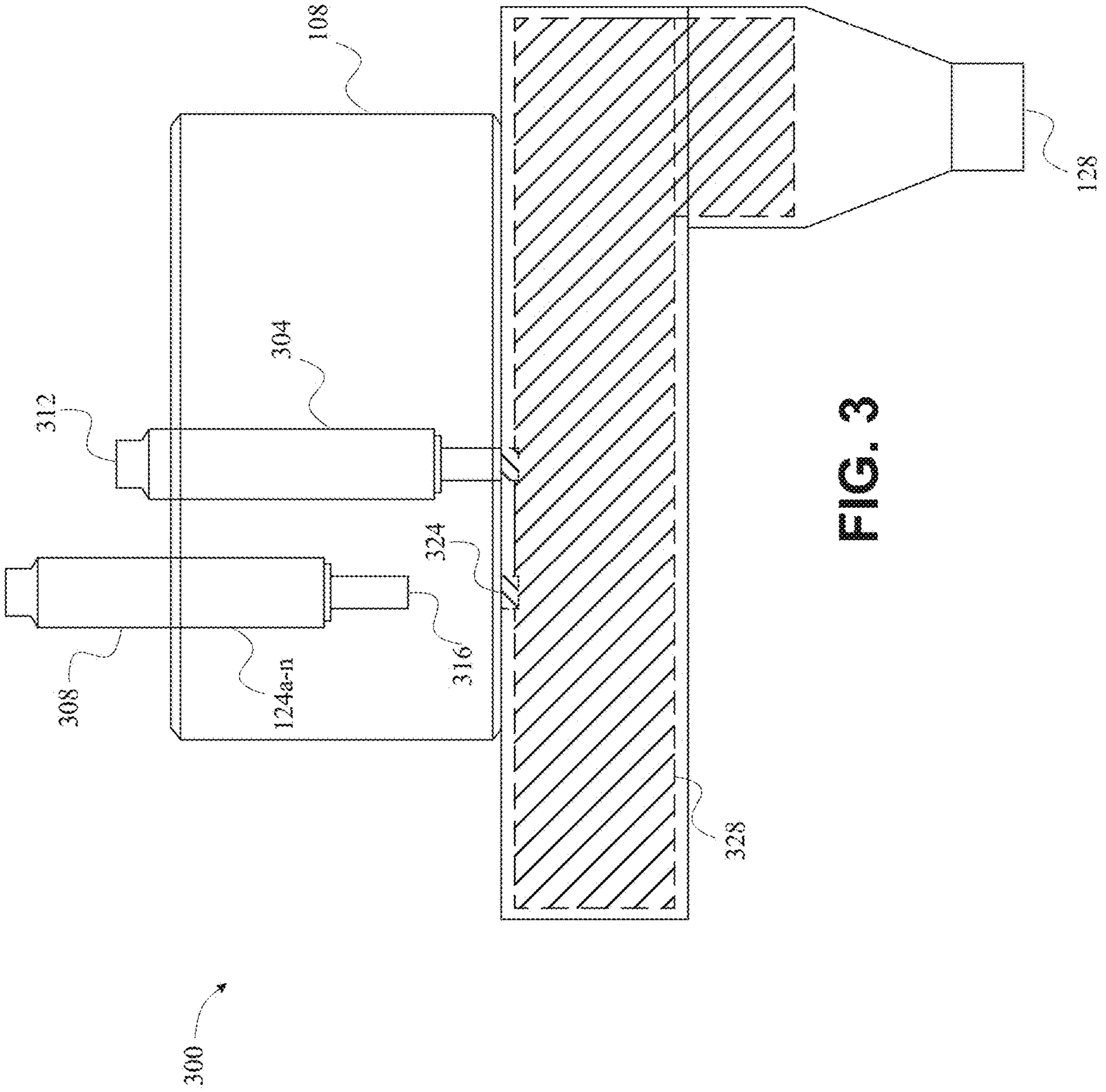
FIG. 3 is a schematic illustration of an exemplary embodiment of an actuator under either a first position or a second position.

Referring now to FIG. 3, an exemplary embodiment of actuator 124*a-n* under either a first position 304 or a second position 308 is illustrated. At least an actuator 124*a-n* within plurality of actuators 124*a-n* is configured to move along an axis between first position 304 and second position 308, the at least an actuator 124*a-n* within the plurality of actuators 124*a-n* comprises a proximal end 312 and a distal end 316, the at least an actuator 124*a-n*, when in the first position 304, is configured to engage its distal end 316 with at least a switch 324 of bar gun 328 to start a liquid flow, and the at least an actuator 124*a-n*, when in the second position 308, is configured to disengage its distal end 316 from the at least a switch 324 of the bar gun 328 to stop the liquid flow. In some cases, at least an actuator 124*a-n* may be engaged with or disengaged from at least a switch 324 by manually applying a pressure through proximal end 312 for a certain period of time, e.g., until a desired amount/volume of liquid is dispensed. In some cases, at least an actuator 124*a-n* may toggle between first position 304 and second position 308 and dispense a preset amount/volume of liquid as a function of one or more commands by a control unit, as described below.

Figure 4:
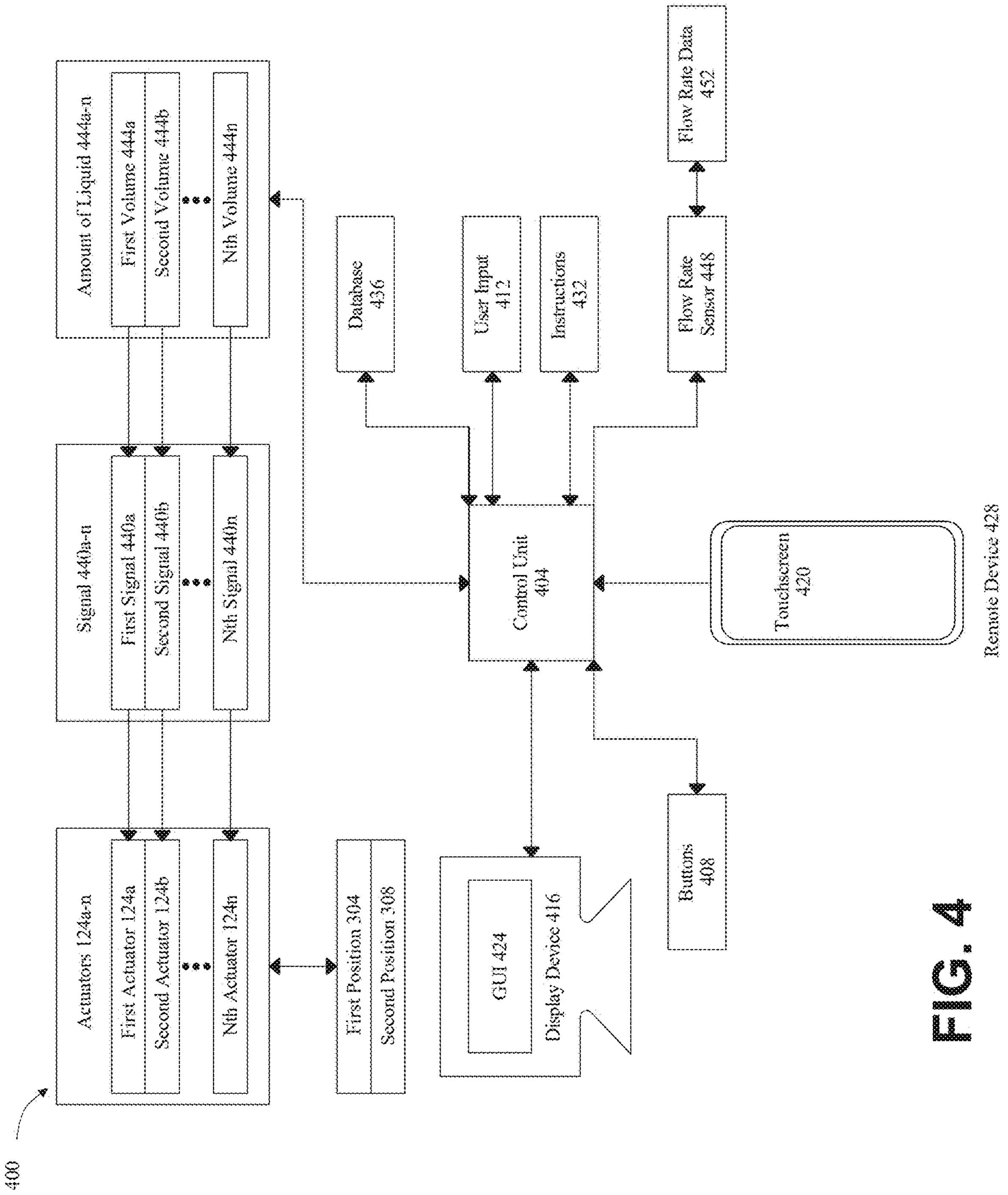
FIG. 4 is a box diagram of an exemplary embodiment of a workflow performed by a control unit.

Referring now to FIG. 4, a box diagram of an exemplary embodiment 400 of a workflow performed by system 100 is illustrated. System 100 comprises a control unit 404 communicatively connected to plurality of actuators 124*a-n*. In one or more embodiments, control unit 404 may comprise a plurality of buttons 408 which may be engaged with or disengaged from actuator 124*a-n* to dispense a certain amount of liquid, as described below. For the purposes of this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections via, for example and without limitation, wireless connection, radio communication, low-power wide-area network, optical communication, magnetic, capacitive, or optical coupling, and the like. In some instances, the terminology "communicatively coupled" may be used in place of communicatively connected in this disclosure.

With continued reference to FIG. 4, in one or more embodiments, control unit 404 may include a computing device. Computing device could include any analog or digital control circuit, including an operational amplifier circuit, a combinational logic circuit, a sequential logic circuit, an application-specific integrated circuit (ASIC), a field programmable gate arrays (FPGA), or the like. Computing device may include a processor communicatively connected to a memory, wherein the memory contains instructions configuring the processor to perform any processing steps described herein. Computing device may include any computing device as described in this disclosure, including without limitation a microcontroller, microprocessor, digital signal processor, and/or system on a chip as described in this disclosure. Computing device may include, be included in, and/or communicate with a mobile device such as a mobile telephone, smartphone, or tablet. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a first computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a nonlimiting example, using a "shared nothing" architecture.

With continued reference to FIG. 4, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. More details regarding computing devices will be described below.

With continued reference to FIG. 4, control unit 404 is configured to receive a user input 412. User input may include any type of request or command directly or indirectly related to a beverage to be dispensed by system 100 regarding the composition and/or quantity of the beverage. In one or more embodiments, user input 412 may include the types or types of ingredients to use, dietary preferences and restrictions (e.g., regular, low-sugar, or zero-sugar diets), desired temperature (cold vs. room temperature, etc.), allergen-related information, desired flavor or flavors, alcohol proof, size of serving, among others. In one or more embodiments, user input 412 may specify an amount of one or more ingredients to dispense, in units such as grams, ounces, milliliters, or the like. In some cases, user input 412 may be revised or updated through one or more secondary user inputs. Additionally and/or alternatively, user input 412 may include one or more modifiers that specify the type and/or amount of one or more additional and/or alternative ingredients. In some cases, instruction 432 may include one or more prescribed orders in which a plurality of ingredients may be added. As a nonlimiting example, user input 412 may include an order for a martini, extra dry, with at least a modifier for reduction of one ingredient to apply to the vermouth, such as using a particular liquor (e.g., vodka versus gin in a martini), using a particular variety of liquor (e.g., blended whiskey, bourbon, scotch, peated, not peated, among others), and/or using one or more particular brands and/or products.

With continued reference to FIG. 4, in one or more embodiments, control unit 404 may include a display device 416. For the purposes of this disclosure, a "display device" is a device configured to show visual information. In some cases, display device 416 may include a liquid crystal display (LCD), a cathode ray tube (CRT), a plasma display, a light emitting diode (LED) display, and any combinations thereof. Display device 416 may include, but is not limited to, a smartphone, tablet, laptop, monitor, tablet, and the like. Display device 416 may include a separate device that includes a transparent screen configured to display computer-generated images and/or information. In some cases, transparent screen may include a touchscreen 420. In one or more embodiments, display device 416 may be configured to visually present data through a user interface or a graphical user interface (GUI) 424 to at least a user, wherein the user may interact with the data through the user interface or GUI 424, as described below. In one or more embodiments, user may view GUI through display device 416. In one or more embodiments, display device 416 may be located on a remote device 428, as described below. In one or more embodiments, receiving user input 412 may include receiving the user input 412 through GUI 424 displayed using display device 416, as described below.

With continued reference to FIG. 4, in one or more embodiments, system 100 may further include a remote device 428 communicatively connected to control unit 404. For the purposes of this disclosure, a "remote device" is a computer device separate and distinct from control unit 404. For example, and without limitation, remote device 428 may include a smartphone, a tablet, a laptop, a desktop computer, or the like. In one or more embodiments, remote device may be communicatively connected to system 100 such as, for example, through network communication, through Bluetooth communication, and/or the like. In one or more embodiments, receiving user input 412 may include receiving the user input 412 through remote device 428. In one or more embodiments, one or more user inputs 412 from one or more users may be submitted through a user interface, such as GUI 424, displayed using remote device 428, as described below.

With continued reference to FIG. 4, for the purposes of this disclosure, a "user interface" is a means by which a user and a computer system interact, for example, using input devices and software. User interface may include a GUI 424, command line interface (CLI), menu-driven user interface, touch user interface, voice user interface (VUI), form-based user interface, any combination thereof, or the like. In one or more embodiments, a user may interact with user interface using a computing device distinct from and communicatively connected to control unit 404, such as a smartphone, tablet, or the like operated by the user. User interface may include one or more graphical locator and/or cursor facilities allowing user to interact with graphical models and/or combinations thereof, for instance using a touchscreen, touchpad, mouse, keyboard, and/or other manual data entry device. For the purposes of this disclosure, a "graphical user interface (GUI)" is a type of user interface that allows end users to interact with electronic devices through visual representations. In one or more embodiments, GUI 424 may include icons, menus, other visual indicators or representations (graphics), audio indicators such as primary notation, display information, and related user controls. Menu may contain a list of choices and may allow users to select one from them. A menu bar may be displayed horizontally across the screen as a pull-down menu. Menu may include a context menu that appears only when user performs a specific action. Files, programs, web pages, and the like may be represented using a small picture within GUI 424. In one or more embodiments, GUI 424 may include a graphical visualization of a user profile and/or the like. In one or more embodiments, control unit 404 may be configured to modify and/or update GUI 424 as a function of at least an user input 412 or the like by populating a user interface data structure and visually presenting data through modification of the GUI 424.

With continued reference to FIG. 4, in one or more embodiments, GUI 424 may contain one or more interactive elements. For the purposes of this disclosure, an "interactive element" is an element within GUI 424 that allows for communication with control unit 404 by one or more users. For example, and without limitation, interactive elements may include a plurality of tabs wherein selection of a particular tab, such as for example, by using a fingertip, may indicate to system 100 to perform a particular function and display the result through GUI 424. In one or more embodiments, interactive element may include tabs within GUI 424, wherein the selection of a particular tab may result in a particular function. In one or more embodiments, interactive elements may include words, phrases, illustrations, and the like to indicate a particular process that one or more users would like system 100 to perform. A person of ordinary skill in the art, upon reviewing the entirety of this disclosure, will be aware of various ways in which user interfaces, GUIs 424, and/or elements thereof may be implemented and/or used for system 100 as described in this disclosure.

With continued reference to FIG. 4, in one or more embodiments, receiving user input 412 may include retrieving a plurality of instructions 432 as a function of the user input 412. For the purposes of this disclosure, an "instruction" is a step or a series of steps that governs how system 100 may perform one or more of its functions and may contain any information consistent with user input 412, as described above, such as without limitation, the types or types of ingredients to use, how much (i.e., in grams, ounces, milliliters, or the like) of each ingredient to use, the sequence of adding the ingredients, and steps and/or precautions to be taken when combining the ingredients, among others. As a nonlimiting example, instruction 432 or a set of instructions 432 may include one or more recipes for making a beverage such as a cocktail. In some cases, instruction 432 may include one or more subsets of prebuilt instructions included within or otherwise accessible to control unit 404 and filtered upon applying certain inclusion/exclusion criteria as a function of user input 412, as described above. In some cases, instruction 432 may be deposited to and/or retrieved from a database 436. Database 436 may include any type of database and/or may be implemented in any manner suitable for implementation of databases. For the purposes of this disclosure, a "database" is an organized collection of data or a type of data store based on the use of a database management system (DBMS), the software that interacts with end users, applications, and the database itself to capture and analyze the data. Database 436 may be implemented, without limitation, as a relational database, a key-value retrieval database such as a NoSQL database, or any other format or structure for use as database that a person of ordinary skill in the art would recognize as suitable upon review of the entirety of this disclosure. Database 436 may alternatively or additionally be implemented using a distributed data storage protocol and/or data structure, such as a distributed hash table or the like. Database 436 may include a plurality of data entries and/or records as described in this disclosure. Data entries in database 436 may be flagged with or linked to one or more additional elements of information, which may be reflected in data entry cells and/or in linked tables such as tables related by one or more indices in database 436 or another relational database. A person of ordinary skill in the art, upon reviewing the entirety of this disclosure, will be aware of various ways in which data entries in database 436 may store, retrieve, organize, and/or reflect data and/or records as used herein, as well as categories and/or populations of data consistently with this disclosure.

With continued reference to FIG. 4, control unit 404 is configured to determine an amount of liquid to dispense as a function of user input 412, as described above, and dispense the amount of liquid by sending at least a signal 440_a-n_ to at least an actuator 124_a-n_ of plurality of actuators 124_a-n_, wherein the signal 440_a-n_ causes the at least an actuator 124_a-n_ to move between first position 304 and second position 308. For the purposes of this disclosure, a "signal" is any intelligible representation of data, for example from one device to another. Signal 440_a-n_ may include an optical signal, a hydraulic signal, a pneumatic signal, a mechanical signal, an electric signal, a digital signal, an analog signal, and the like. In some cases, signal 440_a-n_ may be used to communicate with a computing device, for example by way of one or more ports. In some cases, signal 440_a-n_ may be transmitted and/or received by computing device for example by way of an input/output port. Analog signal may be digitized, for example, by way of an analog to digital converter. In some cases, analog signal may be processed, for example by way of any analog signal processing steps described in this disclosure, prior to digitization. In some cases, digital signal may be used to communicate between two or more devices, including without limitation computing devices. In some cases, digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 4, In one or more embodiments, moving at least an actuator 124_a-n_ of the plurality of actuators 124_a-n_ may include selectively engaging at least a button 408 of plurality of buttons 408 within control unit 404 with proximal end 312 of at least an actuator 124_a-n_ by applying a pressure. In some cases, the selective engagement between at least a button 408 of the plurality of buttons 408 and proximal end 312 of the at least an actuator is controlled by electronic means.

With continued reference to FIG. 4, in one or more embodiments, dispensing amount of liquid may include dispensing a liquid mixture 444_a-n_ as a function of plurality of instructions 432. Instructions 432 may be deposited to, stored within, and/or retrieved from database 436, as described above. As a nonlimiting example, dispensing liquid mixture 444_a-n_ may include determining a first volume 444_a_ of a first liquid and a second volume 444_b_ of a second liquid as a function of plurality of instructions 432, wherein the composition of the first liquid is different from the composition of the second liquid. Dispensing liquid mixture 444_a-n_ may include dispensing the first volume 444_a_ of the first liquid by sending a first signal 440_a_ to a first actuator 124_a_ of plurality of actuators 124_a-n_, wherein the first signal 440_a_ causes the first actuator 124_a_ to move between first position 304 and second position 308. Dispensing liquid mixture 444_a-n_ may include dispensing the second volume 444_b_ of the second liquid by sending a second signal 440_b_ to a second actuator 124_b_ of the plurality of actuators, wherein the second signal 440_b_ causes the second actuator 124_b_ to move between first position 304 and the second position 308. Similarly, control unit 404 may be configured to dispense a third, a fourth, or an $N^{th}$ volume 444_c_, 444_d_, or 444_n_ of a third, a fourth, or an $N^{th}$ liquid, respectively, as a function of plurality of instructions 432, by sending a third signal 440_c_, a fourth signal 440_d_, or an $N^{th}$ signal to a third, fourth, or $N^{th}$ actuator 124_c_, 124_d_, or 124_n_. Consistent with details described above, instruction 432 may include one or more modifiers that specify the type and/or amount of one or more additional and/or alternative ingredients. In some cases, instruction 432 may include one or more prescribed orders in which a plurality of ingredients may be added. As a nonlimiting example, when user input 412 includes an order for a martini, extra dry, control unit 404 may retrieve from instruction 432 at least a modifier for reduction of one ingredient to apply to the vermouth, such as using a particular liquor (e.g., vodka versus gin in a martini), using a particular variety of liquor (e.g., blended whiskey, bourbon, scotch, peated, not peated, among others), and/or using one or more particular brands and/or products.

With continued reference to FIG. 4, in one or more embodiments, system 100 may further include a flow rate sensor 448. For the purposes of this disclosure, a "flow rate sensor" is a device installed adjacent to a stream of liquid and configured to measure its real-time flow rate, i.e., the amount or volume of fluid that passes through per unit time, in gallons per minute, liters per minute, milliliters per minute, gallons per second, liters per second, milliliters per second, or another unit similar thereto. In one or more embodiments, dispensing amount of liquid may include initiating a liquid flow by sending an initiation signal 440_a-n_, wherein the initiation signal 440_a-n_ causes at least an actuator 124_a-n_ of plurality of actuators 124_a-n_ to move from second position 308 to first position 304. Dispensing amount of liquid may include receiving flow rate data 452 from flow rate sensor 448, consistent with details described below. Dispensing amount of liquid may include calculating a duration of a liquid flow as a function of the amount of liquid and the received flow rate data 452. Dispensing amount of liquid may include terminating the liquid flow by sending a stop signal 440_a-n_ as a function of the calculated duration, wherein the stop signal 440_a-n_ causes the at least an actuator 124_a-n_ of the plurality of actuators 124_a-n_ to move from first position 304 to second position 308. As a nonlimiting example, when liquid flow is steady, i.e., with a constant or nearly constant flow rate, duration of liquid flow may be calculated by dividing the amount/volume of liquid by the flow rate. As another nonlimiting example, a displaced volume may be calculated by integrating a time-dependent flow rate over time, wherein stop signal 440*a-n* may be sent when the integration matches the amount/volume of liquid to be dispensed.

With continued reference to FIG. 4, in some cases, dispensing amount of liquid may further include controlling the flow rate of the liquid flow using one or more valves. For the purposes of this disclosure, a "valve" is a component that controls fluidic communication between two or more components. As nonlimiting examples, a valve may include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor, as described above. Valve actuators and thereby valves themselves may be controlled by computing device. Computing device and/or control unit 404 may be in communication with valve, for example by way of one or more of electrical communication, hydraulic communication, pneumatic communication, mechanical communication, and the like. As a nonlimiting example, control unit 404 may be configured to send one or more currents or signals to at least a solenoid or electric motor, wherein the at least a solenoid or electric motor is powered to open or close one or more valves, in manners consistent with details described above. In some cases, powering a valve may include amplifying or switching one or more electronic signals using metal-oxide-semiconductor field-effect transistors (MOSFETs), as described below. A person of ordinary skill in the art, upon reviewing the entirety of this disclosure, will be able to recognize how devices such as flow rate sensors 448 and valves may be implemented within system 100*a-c*.

With continued reference to FIG. 4, in one or more embodiments, system 100 and/or one or elements therein may perform one or more of their functions using one or more detectors. For the purposes of this disclosure, a detector is a device configured to capture at least an event, such as an onset, termination, or fluctuation of a liquid flow. In one or more embodiments, detector may be an electrical detector that detects one or more changes in electrical signal as a liquid passes through the detector (e.g., a change in conductivity or resistance). Detector may include an ammeter, a voltmeter, and/or one or more variations thereof. In one or more embodiments, detector may be a photodetector that detects one or more changes in optical signal as a liquid passes through the detector (e.g., a change in refractive index). For the purposes of this disclosure, a "photodetector" is a device or component that, upon receiving at least a photon, generates a measurable change in at least an electrical parameter within a circuit incorporating the photodetector; as a result, other components of the circuit may amplify, detect, record, or otherwise use the signal for purposes that include without limitation analysis of the detected at least a photon, which may be combined with analyses of photons detected by other photodetectors, imaging based on detected photons, and other similar purposes. Photodetector may include, without limitation, avalanche photodiodes (APDs), single photon avalanche diodes (SPADs), silicon photomultipliers (SiPMs), photo-multiplier tubes (PMTs), micro-channel plates (MCPs), micro-channel plate photomultiplier tubes (MCP-PMTs), indium gallium arsenide semiconductors (InGaAs), photodiodes, and/or photosensitive or photon-detecting circuit elements, semiconductors and/or transducers. For the purposes of this disclosure, avalanche photo diodes (APDs) are diodes (e.g. without limitation p-n, p-i-n, and others) reverse-biased such that a single photo-generated carrier can trigger a short, temporary "avalanche" of photocurrent on the order of milliamps or more caused by electrons being accelerated through a high field region of the diode and impact-ionizing covalent bonds in the bulk material, these in turn triggering greater impact ionization of electron-hole pairs. APDs provide a built-in stage of gain through avalanche multiplication. When the reverse bias is less than the breakdown voltage, the gain of the APD is approximately linear. For silicon APDs, this gain is on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse-biased significantly above the breakdown voltage is referred to as a single photon avalanche diode, or SPAD. In this case, the n-p electric field is sufficiently high to sustain an avalanche of current with a single photon, hence referred to as "Geiger mode". This avalanche current rises rapidly (on a sub-nanosecond timescale), such that detection of the avalanche current can be used to approximate the arrival time of the incident photon. The SPAD may be pulled below breakdown voltage once triggered in order to reset or quench the avalanche current before another photon may be detected, as while the avalanche current is active, carriers from additional photons may have a negligible effect on the current in the diode.

With continued reference to FIG. 4, a plurality of photodetectors may be in close proximity to each other. For instance, each photodetector may be placed directly next to neighboring photodetectors of plurality of photodetectors, for instance in a two-dimensional grid, a grid on a curved surface or manifold, or the like. Placement in close proximity may eliminate or reduce to a negligible level spatially dependent variation in received signals, permitting a control circuit, as described below, to infer other causes for signal variation between detectors. As a nonlimiting example, an array of photodetectors may be comprised of photodetectors occupying a length or breadth of less than 25 μm, permitting a resolution of more than 1,600 per square millimeter; by introducing electrical connections on a second level of a multilevel wafer, or similar techniques, the resolution of the array may be limited only by the package size and/or fabrication size of photodetectors.

With continued reference to FIG. 4, photodetectors and/or array of photodetectors may be constructed using any suitable fabrication method. Fabrication may be performed by assembling one or more electrical components and/or photodetectors in one or more circuits. Electrical components may include passive and active components, including without limitation resistors, capacitors, inductors, switches or relays, voltage sources, and the like. Electrical components may include one or more semiconductor components, such as diodes, transistors, and the like, consisting of one or more semiconductor materials, such as without limitation silicon, germanium, indium, gallium, arsenide, nitride, mercury, cadmium, and/or telluride, processed with dopants, oxidization, and ohmic connection to conducting elements such as metal leads. Some components may be fabricated separately and/or acquired as separate units and then combined with each other or with other portions of circuits to form circuits. Fabrication may depend on the nature of a component; for instance, and without limitation, fabrication of resistors may include forming a portion of a material having a known resistivity in a length and cross-sectional volume producing a desired degree of resistance, an inductor may be formed by performing a prescribed number of wire winding about a core, a capacitor may be formed by sandwiching a dielectric material between two conducting plates, and the like. Fabrication of semiconductors may follow essentially the same general process in separate and integrated components as set forth in further detail below; indeed, individual semiconductors may be grown and formed in lots using integrated circuit construction methodologies for doping, oxidization, and the like, and then cut into separate components afterwards. Fabrication of semiconductor elements, including without limitation diodes, transistors, and the like, may be achieved by performing a series of oxidization, doping, ohmic connection, material deposition, and other steps to create desired characteristics; persons skilled in the art, upon reviewing the entirety of this disclosure, will be aware of various techniques that may be applied to manufacture a given semiconductor component or device.

With continued reference to FIG. 4, one or more components and/or circuits may be fabricated together to form an integrated circuit. This may generally be achieved by growing at least a wafer of semiconductor material, doping regions of it to form, for instance, npn junctions, pnp junctions, p, n, p+, and or n+ regions, and/or other regions with local material properties, to produce components and terminals of semiconductor components such as base, gate, source and drain regions of a field-effect transistor such as a so-called metal oxide field-effect transistor (MOSFET), base, collector and emitter regions of bipolar junction BJT transistors, and the like. Common field-effect transistors include but are not limited to carbon nanotube field-effect transistor (CNFET), junction gate field-effect transistor (JFET), metal-semiconductor field-effect transistor (MESFET), high-electron-mobility transistor (HEMT), metal-oxide-semiconductor field-effect transistor (MOSFET), inverted-T field-effect transistor (ITFET), fin field-effect transistor (FinFET), fast-recovery epitaxial diode field-effect transistor (FREDFET), thin-film transistor, organic field-effect transistor (OFET), ballistic transistor, floating-gate transistor, ion-sensitive field-effect transistor (IFSET), electrolyte-oxide-semiconductor field-effect transistor (EOSFET), and/or deoxyribonucleic acid field-effect transistor (DNAFET). A person of ordinary skill in the art will be aware of various forms or categories of semiconductor devices that may be created, at least in part, by introducing dopants to various portions of a wafer. Further fabrication steps may include oxidization or other processes to create insulating layers, including without limitation at the gate of a field-effect transistor, formation of conductive channels between components, and the like. In one or more embodiments, logical components may be fabricated using combinations of transistors and the like, for instance by following a complimentary MOSFET (CMOS) process whereby desired element outputs based on element inputs are achieved using complementary circuits each achieving the desired output using active-high and active-low MOSFETS or the like. CMOS and other processes may similarly be used to produce analog components and/or components or circuits combining analog and digital circuit elements. Deposition of doping material, etching, oxidization, and similar steps may be performed by selective addition and/or removal of material using automated manufacturing devices in which a series of fabrication steps are directed at particular locations on the wafer and using particular tools or materials to perform each step; such automated steps may be directed by or derived from simulated circuits as described in further detail below.

With continued reference to FIG. 4, fabrication may include the deposition of multiple layers of wafer; as a nonlimiting example, two or more layers of wafer may be constructed according to a circuit plan or simulation which may contemplate one or more conducting connections between layers; circuits so planned may have any three-dimensional configuration, including overlapping or interlocking circuit portions, as described in further detail below. Wafers may be bound together using any suitable process, including adhesion or other processes that securely bind layers together; in some embodiments, layers are bound with sufficient firmness to make it impractical or impossible to separate layers without destroying circuits deposited thereon. Layers may be connected using vertical interconnect accesses (VIA or via), which may include, as a nonlimiting example, holes drilled from a conducting channel on a first wafer to a conducting channel on a second wafer and coated with a conducting material such as tungsten or the like, so that a conducting path is formed from the channel on the first wafer to the channel on the second wafer. VIAs may also be used to connect one or more semiconductor layers to one or more conductive backing connections, such as one or more layers of conducting material etched to form desired conductive paths between components, separate from one another by insulating layers, and connected to one another and to conductive paths in wafer layers using VIAs.

With continued reference to FIG. 4, each photodetector of plurality of photodetectors may have at least a signal detection parameter. As used herein, a signal detection parameter is a parameter controlling the ability of a photodetector to detect at least a photon and/or one or more properties of a detected photon. In one or more embodiments, a signal detection parameter may determine what characteristic or characteristics at least a photon directed to the photodetector must possess to be detected. For instance, a signal detection parameter may include a wavelength and/or frequency at which a photon may be detected, a time window within which detection is possible at a particular photodetector, an angle of incidence, polarization, or other attributes or factors as described in further detail below. A signal detection parameter may include an intensity level of the at least a photon, i.e. a number of photons required to elicit a change in at least an electrical parameter in a circuit incorporating the at least a photodetector. Plurality of photodetectors may have heterogenous signal detection parameters; signal detectors and/or signal detection parameters may be heterogeneous where the plurality of photodetectors includes at least a first photodetector having a first signal detection parameter of the at least a signal detection parameter and at least a second photodetector having a second signal detection parameter of the at least a signal detection parameter, and where the at least a first signal detection parameter differs from the at least a second signal detection parameter. Heterogenous signal detection parameters may assist array in eliminating noise, increase the ability of array to detect attributes of tissue being sampled, and/or increase the temporal resolution of array.

With continued reference to FIG. 4, at least a signal detection parameter may include a temporal detection window. For the purposes of this disclosure, a temporal detection window is a period of time during which a photodetector is receptive to detection of photons, such as when an SPAD is in pre-avalanche mode as described above. Temporal detection window may be set by a delay after a given event or time, including reception of signal by another photodetector. This may be accomplished using delay circuitry. Delay circuitry may operate to set photodetector to a receptive mode at the desired time. SPADs and other similar devices have the property that the bias voltage may be dynamically adjusted such that the detector is "off" or largely insensitive to incoming photons when below breakdown voltage, and "on" or sensitive to incoming photons when above breakdown voltage. Once a current has been registered indicating photon arrival, the diode may be required to be reset via an active or passive quenching circuit. This may lead to a so-called "dead time" in which no arriving photons are counted. Varied temporal detection windows may permit a control circuit as described below to set bias voltages in a sequence corresponding to initiation of each temporal detection window, so that while one detector is quiescent, other nearby detectors are capable of receiving signals. As a nonlimiting example, a first signal detection parameter may include a first temporal detection window, a second signal detection parameter may include a second temporal detection window, and at least a portion of the first temporal detection window may not overlap with the second temporal detection window.

With continued reference to FIG. 4, delay circuitry may also block circuit transmission of signals from photodetectors that are outside their temporal detection windows, for instance by passing output of photodetectors through a Boolean "AND" gate having a second input at delay circuitry and passing a "false" value to the second input for any detector outside its temporal detection window. The increase in temporal and/or spatial resolution of a SPAD or other photodetector may have several advantages when applied to 2D or 3D imaging of biological tissue, such as the eye or other organ, based on a time-of-flight measurement device or the like. This may particularly be the case when interested in detecting time-varying signals with good spatial resolution. In a representative use, time-varying absorption of photons may be correlated to blood oxygenation. In another use, Doppler flow measurement may be more accurate in a system with greater time and/or spatial resolution. This approach may have additional utility in industrial applications e.g. automotive Lidar, where the ability to increase spatial and/or temporal resolution within all or some regions of the field of view is of interest.

With continued reference to FIG. 4, setting of receptive modes of photodetectors and/or intensity levels at which photodetectors emit detection signals may be controlled using a bias control circuit. Bias control circuit may function to set a bias of a photodetector to enable detection of some quantity of photons. In the case of SPAD detector, voltage bias of diode may be programmable in one or more steps such that the SPAD may be reverse-biased above the breakdown voltage of the junction in order to enable "Geiger-mode" single photon detection or biased below breakdown voltage to enable linear gain detection mode. In the case of other detector types of variable gain (e.g. PMT, MCP, MCP-MPT, photodiode, or the like), voltage bias may be programmable to enable adjustable gain. Gain may be fixed, adjusted dynamically via feedback from the incident photon flux (e.g. to avoid saturation), or via other means, e.g. lookup table or other. In an embodiment, gain may be used to determine an intensity of a detected at least a photon. Voltage bias control of the detector may be triggered via some means, such as without limitation via local delay elements such as buffer circuits, fixed or programmable or triggered by a timing reference, e.g., a reference clock edge or the like. In the case of SPAD detector, detector bias control may incorporate an active, passive or combination quenching circuit to reset the diode. Reset signal may be based on photocurrent reaching a threshold level, change in photocurrent level (e.g. via sense amplifier) or other. Detector bias control may incorporate stepwise voltage level adjustment to minimize after-pulsing and other noise sources. Detector bias control may incorporate adiabatic methods to recover energy and reduce power of a high voltage bias system. System may incorporate delay logic, which may include, without limitation, local delay elements fixed or programmable and/or controlled via other reference timing circuitry. Delay logic may incorporate feedback from the incident photon flux or via other means, such as without limitation a lookup table or other. A person of ordinary skill in the art, upon reviewing the entirety of this disclosure, will be able to identify how to select and/or implement one or more photodetectors for system 100*a-c*.

Figure 5A:
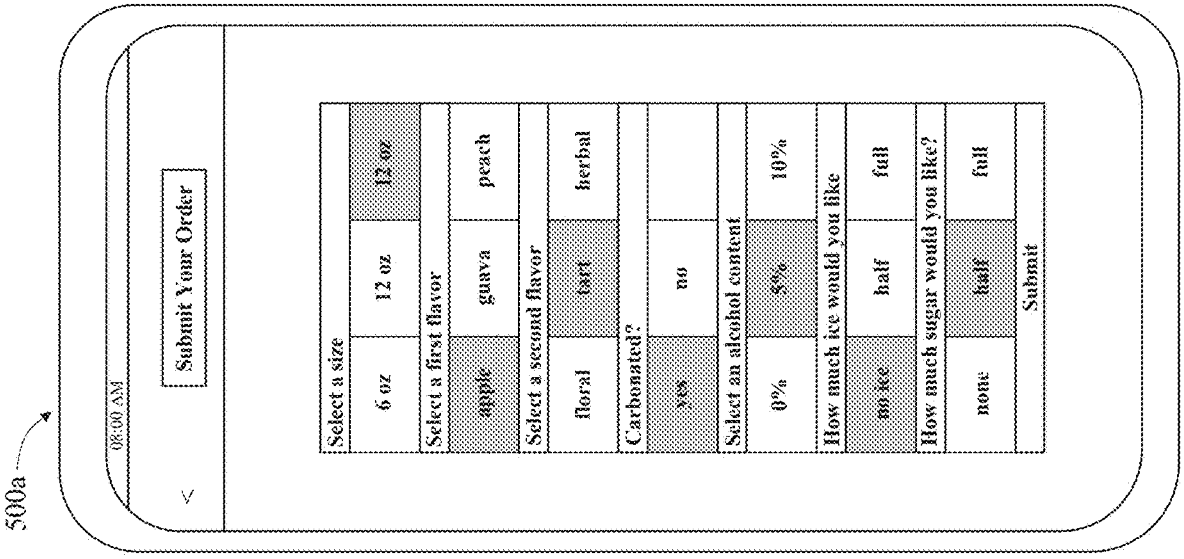
FIG. 5A-B are schematic illustrations of exemplary embodiments of a graphical user interface.
Figure 5B:
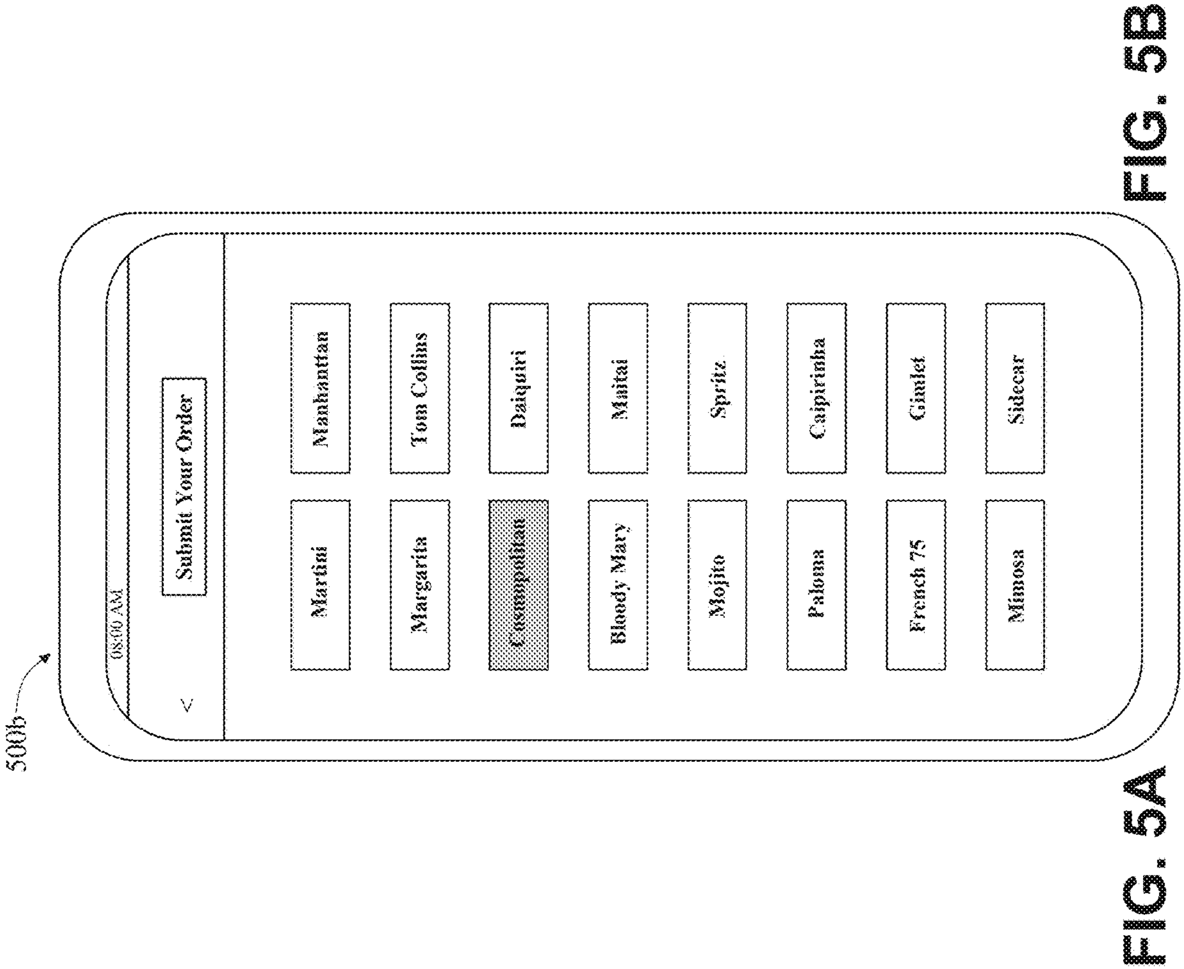

Referring now to FIG. 5A-B, exemplary embodiments 500*a-b* of GUI 424 are illustrated. GUI 424 may provide users with information about available beverages. In FIG. 5A, embodiment 500*a* shows a plurality of tabs within GUI 424 including options such as the size and flavor of beverage, alcohol content, among others, from which user may select as user input 412 to initiate an order. In FIG. 5B, embodiment 500*b* shows a plurality of preset options for mixtures 444*a-n* that may be selected to retrieve instructions 432, combine ingredients, and dispense one or more cocktails accordingly. The information displayed or otherwise available for display in GUI 424 may be entered, deleted, or otherwise altered and updated by somebody in charge of restocking supplies, especially when replenishing beverages or reloading ingredients. Additionally, and/or alternatively, such information may be monitored and/or updated using sensors, e.g. flow rate sensor 448 described above, configured to detect when a receptacle is empty or otherwise not supplying fluid, a scale or load sensor configured to detect when the mass of a container drops below a threshold (i.e., indicating it is empty or getting close to empty), or the like. Accordingly, one or more tabs or buttons within GUI 424 may be greyed out, crossed out, or otherwise turned unresponsive, indicating that one or more beverages and/or one or more recipes related thereto are out of stock or otherwise unavailable. As a nonlimiting example, the tab or button used to dispense Cosmopolitan, as shown in FIG. 5B, may be greyed out when one of its required ingredients, e.g., vodka, is out of stock.

With continued reference to FIG. 5A-B, GUI 424 may include one or more interactive components, as described above. In one or more embodiments, shaded tabs may be used to indicate that an option has been selected, as shown in FIG. 5A-B. In some cases, a tab or button may be highlighted once selected. In some cases, a tab or button, upon selection, may switch from a first color to a second color, wherein the first color is different from the second color; accordingly, user is notified that a selection has been made. In some cases, one or more interactive components described herein may include a use of haptic technology, wherein control unit 404 may be configured to create an experience of touch by applying forces, vibrations, or motions to user when one or more selections are being made.

With continued reference to FIG. 5A-B, in one or more embodiments, display device 416 and/or remote device 428 may be configured to display at least an event handler graphic corresponding to at least an event handler. For the purposes of this disclosure, an "event handler graphic" is a graphical element with which user may interact using display device 416 and/or remote device 428 to enter data, for instance and without limitation, for user input 412 or the like as described above. Event handler graphic may include, without limitation, a button, a link, a checkbox, a text entry box and/or window, a drop-down list, a slider, or any other event handler graphic deemed suitable by a person of ordinary skill in the art upon reviewing the entirety of this disclosure. For the purposes of this disclosure, an "event handler" is a module, data structure, function, and/or routine that performs an action on display device 416 and/or remote device 428 in response to one or more user inputs 412. For instance, and without limitation, event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to user in response to such requirements. Event handler may convert data into expected and/or desired formats, for instance such as date formats, currency entry formats, name formats, or the like. Event handler may transmit data from a remote device 428 to control unit 404 and/or computing device.

With continued reference to FIG. 5A-B, in one or more embodiments, event handler may include a cross-session state variable. For the purposes of this disclosure, a "cross-session state variable" is a variable recording data entered on remote device 428 during a previous session. Such data may include, for instance, previously entered text, previous selections of one or more elements as described above, or the like. For instance, cross-session state variable data may represent a search that user entered in a past session. Cross-session state variable may be saved using any suitable combination of client-side data storage on remote device 428 and server-side data storage on computing device; for instance, data may be saved wholly or in part as a "cookie" which may include data or an identification of remote device 428 to prompt provision of cross-session state variable by the computing device, which may store the data on the computing device. Alternatively, or additionally, computing device may use login credentials, device identifier, and/or device fingerprint data to retrieve cross-session state variable, which the computing device may transmit to remote device 428. Cross-session state variable may include at least a prior session datum. A prior session datum may include any element of data that may be stored in cross-session state variable. Event handler graphic may be further configured to display at least a prior session datum, for instance and without limitation, by auto-populating user input data from previous sessions.

With continued reference to FIG. 5A-B, in one or more embodiments, control unit 404 and/or computing device may configure display device 416 and/or remote device 428 to generate a graphical view. For the purposes of this disclosure, a "graphical view" is a data structure that results in display of one or more graphical elements on a screen. Graphical view may include at least a display element. For the purposes of this disclosure, a "display element" is an image that a program and/or data structure may cause to be displayed. Display elements may include, without limitation, windows, pop-up boxes, web browser pages, display layers, and/or any other display element deemed relevant by a person of ordinary skill in the art upon reviewing the entirety of this disclosure. Graphical view may include at least a selectable event graphic corresponding to one or more selectable event handlers. For the purposes of this disclosure, a "selectable event graphic" is a graphical element that, upon selection using a cursor or other locator as manipulated using a locator device such as a mouse, touchscreen, track pad, joystick, or the like, will trigger an action to be performed. As a nonlimiting example, a selectable event graphic may include a redirection link, defined as a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of selectable event graphic. Redirection may be performed using any event handler, including without limitation event handlers detecting the click of a mouse or other locator, access of redirection link using a touchscreen, the selection of any key, mouseover events, or the like.

Figure 6:
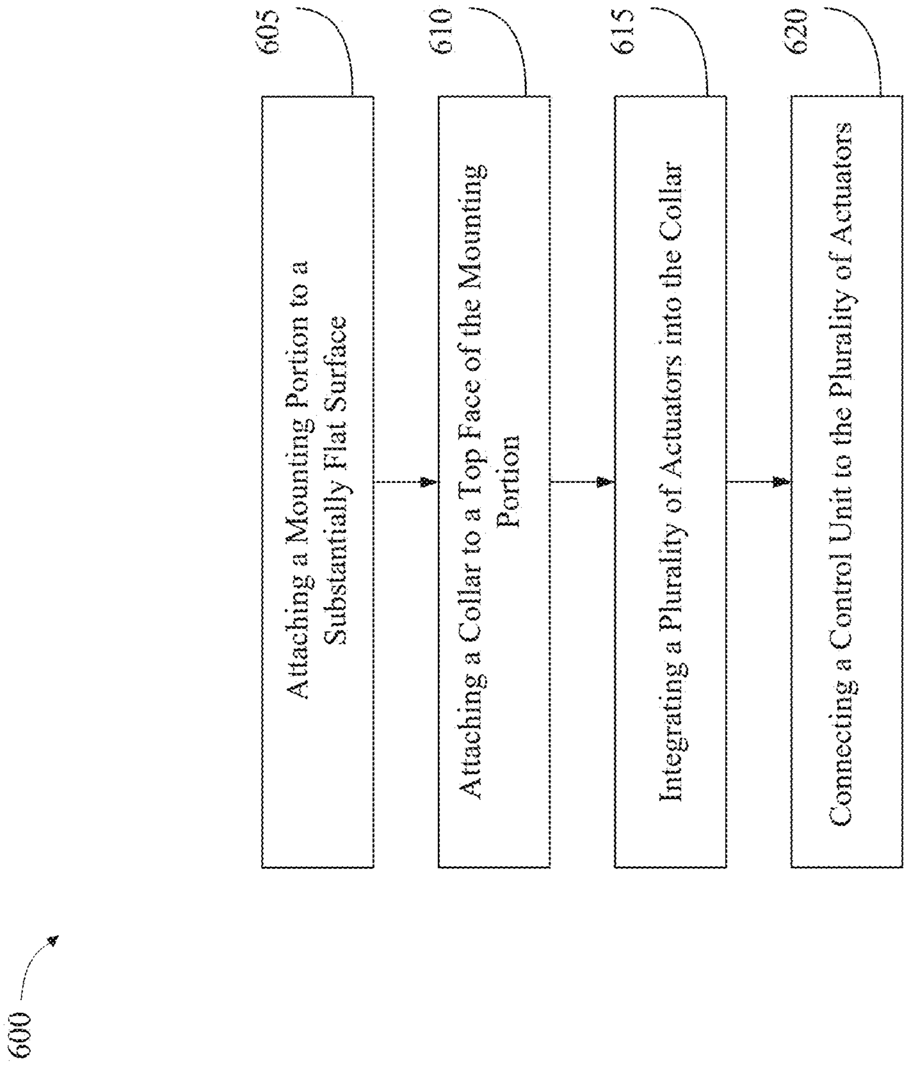
FIG. 6 is a flow diagram of an exemplary embodiment of a method of manufacturing an integrated liquid dispensing system.

Referring now to FIG. 6, an exemplary embodiment of a method 600 for manufacturing liquid dispensing system 100 is described. At step 605, method 600 includes attaching mounting portion 104 to a substantially flat surface. This step may be implemented with reference to details described above in this disclosure and without limitation.

With continued reference to FIG. 6, at step 610, method 600 includes attaching collar 108 to a top face of mounting portion 104, wherein the collar 108 is configured to accept bar gun 328, the bar gun 328 comprising plurality of switches 324, wherein each switch of plurality of switches is configured to dispense liquid when moved into engaged position. This step may be implemented with reference to details described above in this disclosure and without limitation.

With continued reference to FIG. 6, at step 615, method 600 includes integrating plurality of actuators 124*a-n* into collar 108, wherein at least an actuator 124*a-n* of plurality of actuators 124*a-n* is configured to move along an axis between first position 304 and second position 308, the at least an actuator 124*a-n* comprises proximal end 312 and distal end 316, the at least an actuator 124*a-n*, when in the first position 304, is configured to engage its distal end 316 with at least a switch 324 of bar gun 328 to start liquid flow, and the at least an actuator 124*a-n*, when in the second position 308, is configured to disengage its distal end 316 from the at least a switch 324 of the bar gun 328 to stop the liquid flow. This step may be implemented with reference to details described above in this disclosure and without limitation.

With continued reference to FIG. 6, at step 620, method 600 includes connecting control unit 404 to plurality of actuators 124*a-n*, wherein the control unit 404 is configured to receive user input 412, determine amount of liquid to dispense as a function of the user input 412, and dispense the amount of liquid by sending at least a signal 440*a-n* to at least an actuator 124*a-n* of plurality of actuators 124*a-n*, wherein the signal 440*a-n* causes the at least an actuator 124*a-n* to move between first position 304 and second position 308. This step may be implemented with reference to details described above in this disclosure and without limitation.

Figure 7:
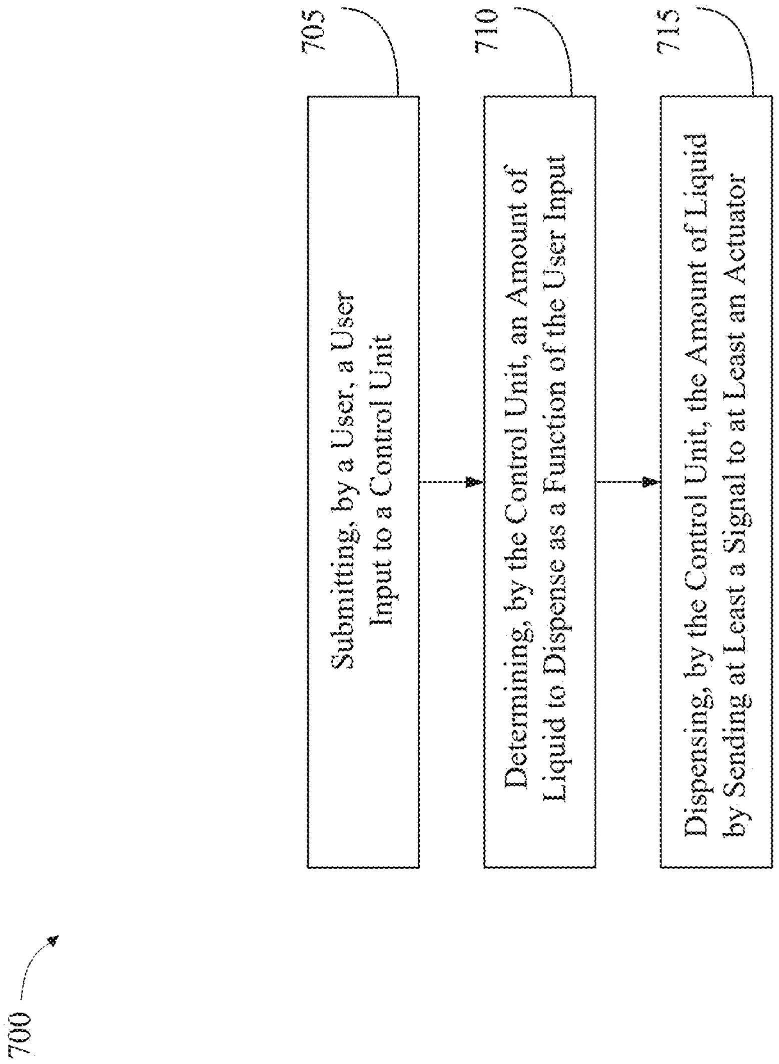
FIG. 7 is a flow diagram of an exemplary embodiment of a method of using an integrated liquid dispensing system.

Referring now to FIG. 7, an exemplary embodiment of a method 700 for using an integrated liquid dispensing system 100 is described. At step 705, method 700 includes submitting, by user, user input 412 to control unit 404. This step may be implemented with reference to details described above in this disclosure and without limitation.

With continued reference to FIG. 7, at step 710, method 700 includes determining, by control unit 404, amount of liquid to dispense as a function of submitted user input 412. This step may be implemented with reference to details described above in this disclosure and without limitation.

With continued reference to FIG. 7, at step 715, method 700 includes dispensing, by control unit 404, amount of liquid by sending at least a signal 440*a-n* to at least an actuator 124*a-n* of plurality of actuators 124*a-n*, wherein the at least an actuator 124*a-n* is configured to move along an axis between first position 304 and second position 308, the at least an actuator 124*a-n* comprises proximal end 312 and distal end 316, the at least an actuator 124*a-n*, when in the first position 304, is configured to engage its distal end 316 with at least a switch 324 of bar gun 328 to start a liquid flow, the at least an actuator 124*a-n*, when in the second position 308, is configured to disengage its distal end 316 from the at least a switch 324 of the bar gun 328 to stop the liquid flow, and the at least a signal 440*a-n* causes the at least an actuator 124*a-n* to move between the first position 304 and the second position 308. This step may be implemented with reference to details described above in this disclosure and without limitation.

Figure 8:
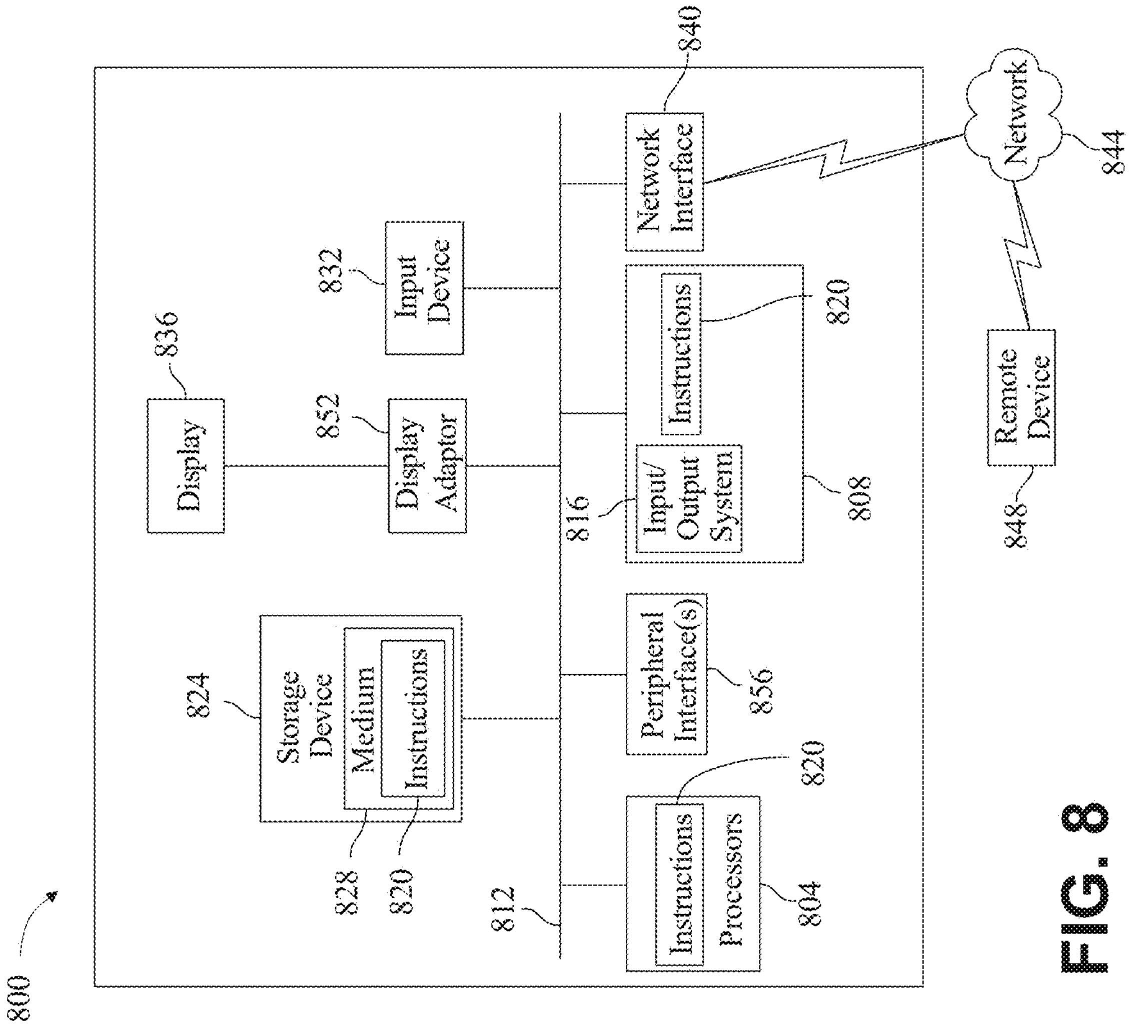
FIG. 8 is a block diagram of a computing system that can be used to implement any one or more of the methodologies disclosed herein and any one or more portions thereof.

Referring now to FIG. 8, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 8, the figure shows a diagrammatic representation of one embodiment of a computing device in the exemplary form of a computing system 800 within which a set of instructions for causing the computing system 800 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 800 may include a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures. Processor 804 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

With continued reference to FIG. 8, memory 808 may include various components (e.g., machine-readable media) including, but not limited to, a random-access memory component, a read only component, and any combinations thereof. In one example, a basic input/output system 816, including basic routines that help to transfer information between elements within computing system 800, such as during start-up, may be stored in memory 808. Memory 808 (e.g., stored on one or more machine-readable media) may also include instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

With continued reference to FIG. 8, computing system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 824 (or one or more components thereof) may be removably interfaced with computing system 800 (e.g., via an external port connector (not shown)). Particularly, storage device 824 and an associated machine-readable medium 828 may provide nonvolatile and/or volatile storage of machine-readable instructions, data structures, program modules, and/or other data for computing system 800. In one example, software 820 may reside, completely or partially, within machine-readable medium 828. In another example, software 820 may reside, completely or partially, within processor 804.

With continued reference to FIG. 8, computing system 800 may also include an input device 832. In one example, a user of computing system 800 may enter commands and/or other information into computing system 800 via input device 832. Examples of input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

With continued reference to FIG. 8, user may also input commands and/or other information to computing system 800 via storage device 824 (e.g., a removable disk drive, a flash drive, etc.) and/or network interface device 840. A network interface device, such as network interface device 840, may be utilized for connecting computing system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computing system 800 via network interface device 840.

With continued reference to FIG. 8, computing system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computing system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An integrated liquid dispensing system, the system comprising:

a mounting portion;

a collar, wherein the collar is attached to a top face of the mounting portion, wherein the collar is configured to accept a bar gun, the bar gun comprising a plurality of switches, wherein each switch of the plurality of switches is configured to dispense liquid when moved into an engaged position;

a plurality of actuators laid out in a 2-1-2-2 formation, wherein each of the plurality of actuators:

are configured to move along an axis between a first position and a second position;

at least an actuator of the plurality of actuators comprises a proximal end and a distal end;

the at least an actuator, of when in the first position, is configured to engage the distal end with at least a switch of the bar gun to start a liquid flow; and when in the second position, is configured to disengage the distal end from the at least a switch of the bar gun to stop the liquid flow; and a control unit communicatively connected to the plurality of actuators, wherein the control unit is configured to:

receive a user input from a user, wherein receiving the user input further comprises:

generating a graphical user interface having a plurality of event handlers corresponding to a plurality of instructions to output beverages and a plurality of event handler graphics corresponding to the plurality of event handlers, wherein the plurality of event handler graphics comprises a cross-session state variable, wherein the cross-session state variable comprises a previous selection of one of the plurality of event handler graphics, wherein the previous selection of one of the plurality of event handler graphics comprises a search entered by the user in a past session;

determining that ingredients for a first beverage associated with a first event handler of the plurality of event handlers are available to dispense;

determining that ingredients for a second beverage associated with a second event handler of the plurality of event handlers are not available to dispense;

disabling the second event handler;

displaying the second event handler graphic with a modification indicating that the second event handler has been disabled;

displaying the first event handler graphic; and receiving a user selection of the first event handler graphic;

determine an amount of liquid to dispense as a function of the user input; and dispense the amount of liquid by sending at least a signal to the at least an actuator of the plurality of actuators, wherein the at least a signal causes the at least an actuator to move between the first position and the second position.

2. The integrated liquid dispensing system of claim 1, wherein:

the at least an actuator comprises a solenoid actuator;

the control unit comprises a plurality of buttons; and moving the at least an actuator of the plurality of actuators comprises selectively engaging at least a button of the plurality of buttons with the proximal end of the at least an actuator by applying a pressure.

3. The integrated liquid dispensing system of claim 2, wherein selective engagement between the at least a button of the plurality of buttons and the proximal end of the at least an actuator is controlled by electronic means.

4. The integrated liquid dispensing system of claim 1, wherein:

the control unit comprises a display device; and receiving the user input comprises receiving the user input through the graphical user interface displayed using the display device.

5. The integrated liquid dispensing system of claim 1, wherein:

receiving the user input comprises retrieving a plurality of instructions as a function of the user input; and dispensing the amount of liquid comprises dispensing a liquid mixture as a function of the plurality of instructions.

6. The integrated liquid dispensing system of claim 5, wherein dispensing the liquid mixture comprises:

determining a first volume of a first liquid and a second volume of a second liquid as a function of the plurality of instructions, wherein a composition of the first liquid is different from a composition of the second liquid;

dispensing the first volume of the first liquid by sending a first signal to a first actuator of the plurality of actuators, wherein the first signal causes the first actuator to move between the first position and the second position; and dispensing the second volume of the second liquid by sending a second signal to a second actuator of the plurality of actuators, wherein the second signal causes the second actuator to move between the first position and the second position.

7. The integrated liquid dispensing system of claim 1, further comprising a remote device communicatively connected to the control unit, wherein receiving the user input comprises receiving the user input through the remote device.

8. The integrated liquid dispensing system of claim 1, wherein dispensing the amount of liquid further comprises:

initiating a liquid flow by sending an initiation signal, wherein the initiation signal causes the at least an actuator of the plurality of actuators to move from the second position to the first position; and moving the at least an actuator of the plurality of actuators from the first position to the second position as a function of the stop signal.

9. The system of claim 1, further comprising a flow rate sensor, wherein dispensing the amount of liquid further comprises:

receiving flow rate data from the flow rate sensor during dispensing;

calculating a displaced volume of the liquid to be dispensed by integrating a time dependent flow rate over time based on the received flow rate data; and terminating dispensing of the liquid by sending a stop signal when the calculated displaced volume of the liquid matches the amount of liquid.

10. The system of claim 1, wherein:

the system further comprises a reservoir including a bottle fitted with a liquid transport tube, wherein the liquid transport tube is fluidly connected to:

a pump such that liquid can be drawn into the liquid transport tube from the reservoir;

a nozzle.

11. A method of using an integrated liquid dispensing system, the method comprising:

submitting, by a user, a user input to a control unit;

determining, by the control unit, an amount of liquid to dispense as a function of the submitted user input, wherein determining the amount of liquid further comprises receiving the user input, and wherein receiving the user input further comprises:

generating a graphical user interface having a plurality of event handlers corresponding to a plurality of instructions to output beverages and a plurality of event handler graphics corresponding to the plurality of event handlers, wherein the plurality of event handler graphics comprises a cross-session state variable, wherein the cross-session state variable comprises a previous selection of one of the plurality of event handler graphics, wherein the previous selection of one of the plurality of event handler graphics comprises a search entered by the user in a past session;

determining that ingredients for a first beverage associated with a first event handler of the plurality of event handlers are available to dispense;

determining that ingredients for a second beverage associated with a second event handler of the plurality of event handlers are not available to dispense;

disabling the second event handler;

displaying the second event handler graphic with a modification indicating that the second event handler has been disabled; and displaying the first event handler graphic;

receiving a user selection of the first event handler graphic; and dispensing, by the control unit, the amount of liquid by sending at least a signal to at least an actuator of a plurality of actuators laid out in a 2-1-2-2 formation, wherein each of the plurality of actuators:

are configured to move along an axis between a first position and a second position;

the at least an actuator comprises a proximal end and a distal end;

each actuator of when in the first position, is configured to engage the distal end with at least a switch of a bar gun to start a liquid flow;

when in the second position, is configured to disengage the distal end from the at least a switch of the bar gun to stop the liquid flow; and the at least a signal causes the at least an actuator to move between the first position and the second position.

12. The method of claim 11, wherein:

the at least an actuator comprises a solenoid actuator;

the control unit comprises a plurality of buttons; and moving the at least an actuator of the plurality of actuators comprises selectively engaging at least a button of the plurality of buttons with the proximal end of the at least an actuator by applying a pressure.

13. The method of claim 12, wherein selective engagement between the at least a button of the plurality of buttons and the proximal end of the at least an actuator is controlled by electronic means.

14. The method of claim 11, wherein:

the control unit comprises a display device; and submitting the user input comprises submitting the user input through the graphical user interface displayed using a display device.

15. The method of claim 11, wherein:

submitting the user input comprises retrieving a plurality of instructions as a function of the user input; and dispensing the amount of liquid comprises dispensing a liquid mixture as a function of the plurality of instructions.

16. The method of claim 15, wherein dispensing the liquid mixture comprises:

determining a first volume of a first liquid and a second volume of a second liquid as a function of the plurality of instructions, wherein a composition of the first liquid is different from a composition of the second liquid;

dispensing the first volume of the first liquid by sending a first signal to a first actuator of the plurality of actuators, wherein the first signal causes the first actuator to move between the first position and the second position; and dispensing the second volume of the second liquid by sending a second signal to a second actuator of the plurality of actuators, wherein the second signal causes the second actuator to move between the first position and the second position.

17. The method of claim 11, wherein submitting the user input comprises submitting the user input through a remote device communicatively connected to the control unit.

18. The method of claim 11, wherein dispensing the amount of liquid comprises:

initiating a liquid flow by sending an initiation signal, wherein the initiation signal causes the at least an actuator of the plurality of actuators to move from the second position to the first position; and moving the at least an actuator of the plurality of actuators from the first position to the second position as a function of the stop signal.

19. The method of claim 11, wherein dispensing the amount of liquid further comprises:

receiving flow rate data from a flow rate sensor during dispensing;

calculating a displaced volume of the liquid to be dispensed by integrating a time dependent flow rate over time based on the received flow rate data; and terminating dispensing of the liquid by sending a stop signal when the calculated displaced volume of the liquid matches the amount of liquid.

20. The method of claim 11, wherein:

the method further comprises dispensing liquid from a reservoir, wherein the reservoir comprises a bottle fitted with a liquid transport tube, wherein the liquid transport tube is fluidly connected to:

a pump such that liquid can be drawn into the liquid transport tube from the reservoir;

a nozzle.

* * * * *